(12) United States Patent
Reveman et al.

(10) Patent No.: US 9,967,207 B2
(45) Date of Patent: May 8, 2018

(54) METHOD FOR ALLOCATING FRAME TRANSMISSION TIME SLOTS

(71) Applicant: TELEFONAKTIEBOLAGET L M ERICSSON (PUBL), Stockholm (SE)

(72) Inventors: Jon Reveman, Vaxholm (SE); Andreas Cleverdal, Älvsjö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 155 days.

(21) Appl. No.: 14/770,495

(22) PCT Filed: Mar. 4, 2013

(86) PCT No.: PCT/SE2013/050190
§ 371 (c)(1),
(2) Date: Aug. 26, 2015

(87) PCT Pub. No.: WO2014/137253
PCT Pub. Date: Sep. 12, 2014

(65) Prior Publication Data
US 2016/0014046 A1 Jan. 14, 2016

(51) Int. Cl.
*H04L 12/911* (2013.01)
*H04L 12/403* (2006.01)
*H04L 12/863* (2013.01)
*H04L 12/741* (2013.01)
*H04L 12/873* (2013.01)
*H04L 12/865* (2013.01)

(52) U.S. Cl.
CPC ........ *H04L 47/826* (2013.01); *H04L 12/4035* (2013.01); *H04L 45/74* (2013.01); *H04L 47/522* (2013.01); *H04L 47/6225* (2013.01); *H04L 47/6275* (2013.01)

(58) Field of Classification Search
None
See application file for complete search history.

(56) References Cited

U.S. PATENT DOCUMENTS

| | | | |
|---|---|---|---|
| 6,356,536 B1 * | 3/2002 | Repke | H04B 1/525 370/282 |
| 6,633,568 B1 | 10/2003 | Han et al. | |
| 6,693,909 B1 * | 2/2004 | Mo | H04L 12/5695 370/392 |
| 2004/0120258 A1 * | 6/2004 | Mattila | H04L 12/5693 370/239 |
| 2012/0163398 A1 * | 6/2012 | Kurita | H04L 12/4035 370/458 |
| 2015/0156165 A1 * | 6/2015 | Lindoff | H04W 8/005 370/329 |

* cited by examiner

*Primary Examiner* — Christopher Crutchfield
*Assistant Examiner* — Thinh Tran

(57) ABSTRACT

Distributed frame transmission method for a local client in a Local switched Network, the method comprises the steps of: determining a number of frame transmission time slots based on the number of local clients in the Network and a Time Distribution Window (TDW) and establishing an Identity Number, ID, of a specific receiving client and allocating a specific frame transmission time slot among said number of frame transmission time slots for transmitting frames to said specific receiving client from a buffer queue dedicated to said specific receiving client based on an ID of the local client, the established ID of said receiving client and the total number of local clients in the Local switched Network.

33 Claims, 24 Drawing Sheets

METHOD FOR ALLOCATING FRAME TRANSMISSION TIME SLOTS

This application is a 371 of International Application No. PCT/SE2013/050190, filed Mar. 4, 2013, the disclosure of which is fully incorporated herein by reference.

TECHNICAL FIELD

The field of the present disclosure relates to transmission of information over a Local switched Network such as Ethernet. More particularly, the proposed technology relates to a distributed frame transmission method for a local client in a Local switched Network, a controller for distributed frame transmission for a local client in a Local switched Network, as well as a local client in a Local switched Network. It also relates to a computer program for performing the distributed frame transmission.

BACKGROUND

A Local switched Network, for example a Local switched Ethernet Network, comprises a number of transmitting and receiving local clients or nodes that are connected to a common switch via segments dedicated to each of the local clients. The purpose of the switch within the Local switched Network is that it should, roughly speaking, act as a bridge interconnecting all of the local clients within the Local switched Network as well as connecting the local clients with the outside world, that is, with transmitting and receiving clients located outside the Local switched Network.

Usually the only devices present on a dedicated segment in the Local switched Network is the switch and the corresponding local client, therefore every frame transmission performed within the Local switched Network is picked up by the switch on the segment dedicated to the receiver and relayed to an intended receiver along the receiving clients dedicated segment. Since the only devices present on a receiving clients dedicated segment are the switch and the receiving client the frames will reach the intended recipient after the relay. With this Network design it is possible to have a large number of conversations occurring simultaneously.

Typically a Local switched Network comprises a large number of local clients with dedicated segments; it is not unusual that a Local switched Network comprises many hundreds of local clients. Due to the fact that all transmitted frames within the network are picked up and relayed by the switch, the strains on the switch will be substantial when there is intensive traffic over the Local switched Network. During such intensive periods there will inevitably pile up frames that are yet to be relayed by the switch. Some of these frames may be buffered in the switch for subsequent relaying but since the buffer capacity of the switch is limited, the frames that are arriving when the buffer queue of the switch is full will be dropped. After being dropped the frames will be lost and will have to be retransmitted from the local client. This will in turn cause substantial traffic delays.

The problem is also present during so called traffic bursts within the Local switched Network, that is, when a large amount of frames are sent to the switch during a relatively short time period. Even if a particular switch buffer is dimensioned to be able to store a large amount of frames there are circumstances when traffic bursts will lead to a saturated buffer capacity and a loss of frames due to frame dropping.

Some measures have been taken to mitigate the problems of frame dropping in a Network due to traffic bursts. In the article, "Delaying Transmission in Data Communication Network to Improve Transport-Layer Performance", Cai, Wolf and Gong, IEEE Journal on selected areas in communication, Vol 29, No. 5, May 2011, a queue based pacing algorithm is presented. This algorithm aims to decrease the burstiness of Network traffic by delaying information packets based on the length of the local packet buffer.

In the article "High-resolution Timer-based Packet Pacing Mechanism on the Linux Operating system", Takano et al, IEICE Transactions on Communications; ISSN 0916-8516; VOL. 2011; NO. 8; page 2199.2207, there is disclosed a high-resolution timer based packet pacing mechanism for reducing the traffic burstiness in a Network.

However, none of the proposed pacing methods solves the problem of dropped frames completely. It is therefore still a need within the art to find new and efficient ways to obtain a robust scheme for frame transmission within a Local switched Network.

SUMMARY

It is a general object to provide for distributed frame transmission in a Local switched Network which will reduce the amount of dropped frames.

In particular it is desirable to provide robust distributed frame transmission that mitigates the problems related to dropped frames due to transmission bursts within the Local switched Network.

It is a specific object to provide a distributed frame transmission method for a local client in a Local switched Network.

It is also an object to provide a controller for distributed frame transmission for a local client in a Local switched Network.

It is another object to provide a local client in a Local switched Network capable of performing distributed frame transmissions.

It is yet another object to provide a computer program for performing, when executed on a computer, distributed frame transmission for a local client in a Local switched Network.

The inventors have realized that the problem related to dropped frames can be mitigated by providing the transmitting local clients within a Local switched Network with a mechanism that distributes frame transmission time slots for transmission in a manner that reduces the risk of dropped frames in a Local switched Network. According to the provided method the emergence of traffic bursts within the Local switched Network is countered at the level of the local clients.

According to a first aspect there is provided a distributed frame transmission method for a local client in a Local switched Network. The method comprises the steps of determining a number of frame transmission time slots based on the number of local clients in the Local switched Network and a Time Distribution Window, TDW, and establishing an Identity Number, ID, of a specific receiving client. The method also comprises the step of allocating a specific frame transmission time slot among the number of frame transmission time slots for transmitting frames to the specific receiving client, from a buffer queue dedicated to the specific receiving client. The allocation of a specific frame transmission time slot is based on the ID of the local client, the established ID of the receiving client and the total number of local clients in the Local switched Network.

According to a second aspect there is provided a controller for distributed frame transmission for a local client in a Local switched Network. The controller comprises a determiner that is configured to determine a number of frame transmission time slots based on the number of local clients in the Local switched Network and a Time Distribution Window (TDW) and an establisher that is configured to establish an ID of a specific receiving client. The controller further comprises an allocator that is configured to allocate a specific frame transmission time slot among the number of frame transmission time slots for transmitting frames to the specific receiving client, from a buffer queue dedicated to the specific receiving client, based on the ID of the local client, the ID of the receiving client and the total number of local clients in the Local switched Network.

According to a third aspect there is provided a local client in a Local switched Network. The local client comprises a determiner that is configured to determine a number of frame transmission time slots based on the number of local clients in the Local switched Network and a Time Distribution Window (TDW) and an establisher that is configured to establish an ID of a specific receiving client. The local client further comprises an allocator that is configured to allocate a specific frame transmission time slot among the number of frame transmission time slots for transmitting frames to the specific receiving client, from a buffer queue dedicated to said specific receiving client, based on the ID of the local client, the ID of the receiving client and the total number of local clients in the Local switched Network.

According to a fourth aspect, there is provided a computer program for performing, when executed by a computer, distributed frame transmission for a local client in a Local switched Network. The computer program comprises program elements that are configured to determine a number of frame transmission time slots based on the number of local clients in the Local switched Network and a Time Distribution Window (TDW), and program elements that are configured to establish the ID of the receiving client. The computer program also comprises program elements that are configured to allocate a specific frame transmission time slot among the number of frame transmission time slots for transmitting frames to a specific receiving client, from a buffer queue dedicated to the specific receiving clients, based on the ID of the local client, the established ID of the receiving client and the total number of local clients in the Local switched Network.

Other advantages and objects will be appreciated upon reading the detailed description.

BRIEF DESCRIPTION OF THE DRAWINGS

The invention, together with further objects and advantages thereof, may best be understood by making reference to the following description taken together with the accompanying drawings, in which.

DETAILED DESCRIPTION

Throughout the drawings, the same reference numbers are used for similar or corresponding elements.

Figure 1:
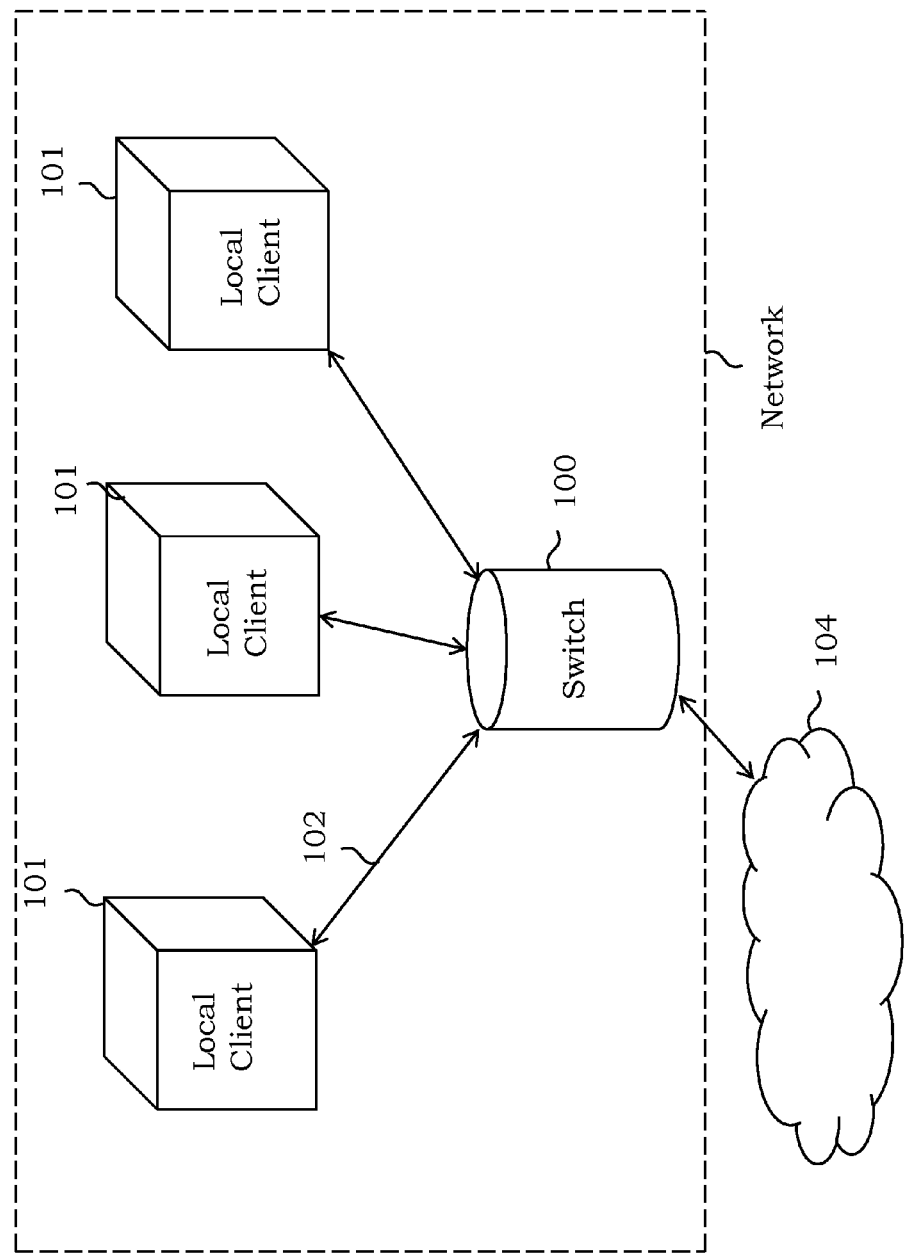
FIG. 1 is a schematic drawing illustrating schematically an example of a Local switched Network.

FIG. 1 illustrates schematically a Local switched Network in which the present methods and devices can be implemented. The Local switched Network comprises in this simplified illustration a switch 100 and local clients 101. Only three local clients 101 are shown, it is however usual to have a large number of local client within a Local switched Network. Several hundred is not unusual. The switch 100 is connected to all the local clients 101 within the Local switched Network through segments 102. Each of these segments corresponds to a specific local client 101, thus there are only two devices on each of the segments, the corresponding local client 101 and the switch 100. The switch 100 also communicates with the outside world, the outside world comprises receiving and transmitting clients 104 that are located outside of the Local switched Network but are allowed to communicate with the local clients 101 in the Local switched Network. The outside world would normally be part of the Internet. The Local switched Network described could for example be a Local switched Ethernet Network.

Since there are only two devices present on each of the segments 102, the corresponding local client 101 and the switch 100, all frames transmitted over the Local switched Network will be picked up by the switch 100 and relayed to the intended recipient. This is also the case for traffic to or from receiving clients 104 located outside the Local switched Network. That is, frames transmitted from within the Local switched Network with address outside of the Local switched Network will be picked up by the switch 100 and relayed to receiving clients 104 located outside the Local switched Network. Traffic coming in to the Local switched Network from clients 104 located outside the Local switched Network will also be picked up by the switch 100 and directed to the intended local client 101 within the Local switched Network.

Figure 2:
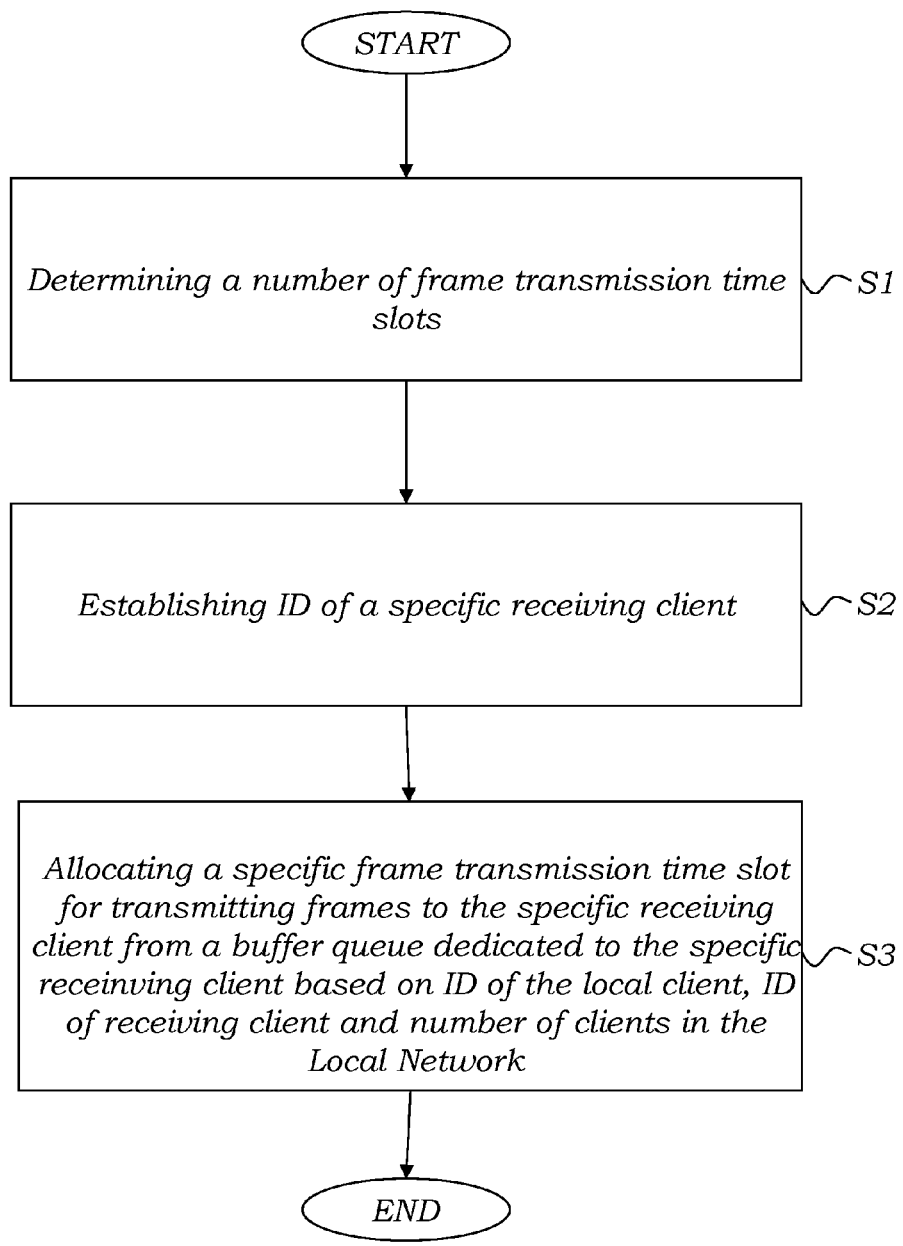
FIG. 2 is a schematic flow diagram illustrating schematically a method for allocating a frame transmission time slot according to an embodiment.

FIG. 2 is a schematic flow diagram illustrating a method for distributed frame transmission according to an embodiment. The method comprises the step of determining (S1) a number of frame transmission time slots based on the number of local clients in the Local switched Network and a Time Distribution Window (TDW). The method also comprises the step of establishing (S2) an Identity Number, ID, of a specific receiving client and the step of allocating (S3) a specific frame transmission time slot among the number of frame transmission time slots for transmitting frames to the specific receiving client, from a buffer queue dedicated to the specific receiving client, based on the ID of the local client, the established ID of the receiving client and the total number of local clients in the Local switched Network.

In this way a distributed frame transmission method is provided that will reduce the amount of dropped frames due to frame congestion leading to a saturated buffer memory in the switch.

As has been mentioned earlier, the inventor has recognized that the amount of frames being dropped due to frame congestion in the switch can be reduced by countering the problem at the level of the local clients 101. This will in turn give a Local switched Network where a minimum number of frames need to be retransmitted due to dropped frames.

The information needed for the step of determining S1 a number of frame transmission time slots could for example be provided to the local client 101 in advance. That is, the local client 101 would be in possession of stored information relating to the number of local clients 101 in the Local switched Network and the size of the Time Distribution Window, TDW. From this information a number of frame transmission time slots are generated. More detailed embodiments of the determining step S1 will be described in what follows.

In the step of establishing S2 an Identity Number, ID, of a receiving client, the local client establishes an ID of the receiving client that corresponds to the destination address of the recipient. Within Ethernet the destination address is a 48-bit address identifying the recipient of the frames. Thus a one-to-one mapping relates the destination address and the ID. The established ID of the receiving client might be represented as an integer. In a particular embodiment the established ID would correspond to a unique integer. The ID is however not limited to numbers but may instead be in the form of symbols such as letters or a combination of letters and integers.

The information that is needed for performing the step of allocating S3 a specific frame transmission time slot, among the number of time slots generated in step S1, to the local client for transmitting frames to the specific receiving client, from a buffer queue dedicated to the specific receiving client, relates to the ID of the local client 101. This ID is a unique ID that corresponds to the source address. Within an Ethernet Network the source address is a 48-bit address identifying the transmitter of the frames. Thus a one-to-one mapping relates the source address with the ID of the local client. The ID of the local client might for example be represented as an integer. In a particular embodiment the established ID would correspond to a unique integer.

The ID of the receiving client established in step S2, and the ID of the transmitting local client 101 that is used in step S3, could in one embodiment be provided in advance. That is, the transmitting local client would be in possession of stored information relating the destination address of the receiving client with a unique ID and the source address, i.e. the transmitting local clients own address, with a corresponding unique ID.

Figure 3:
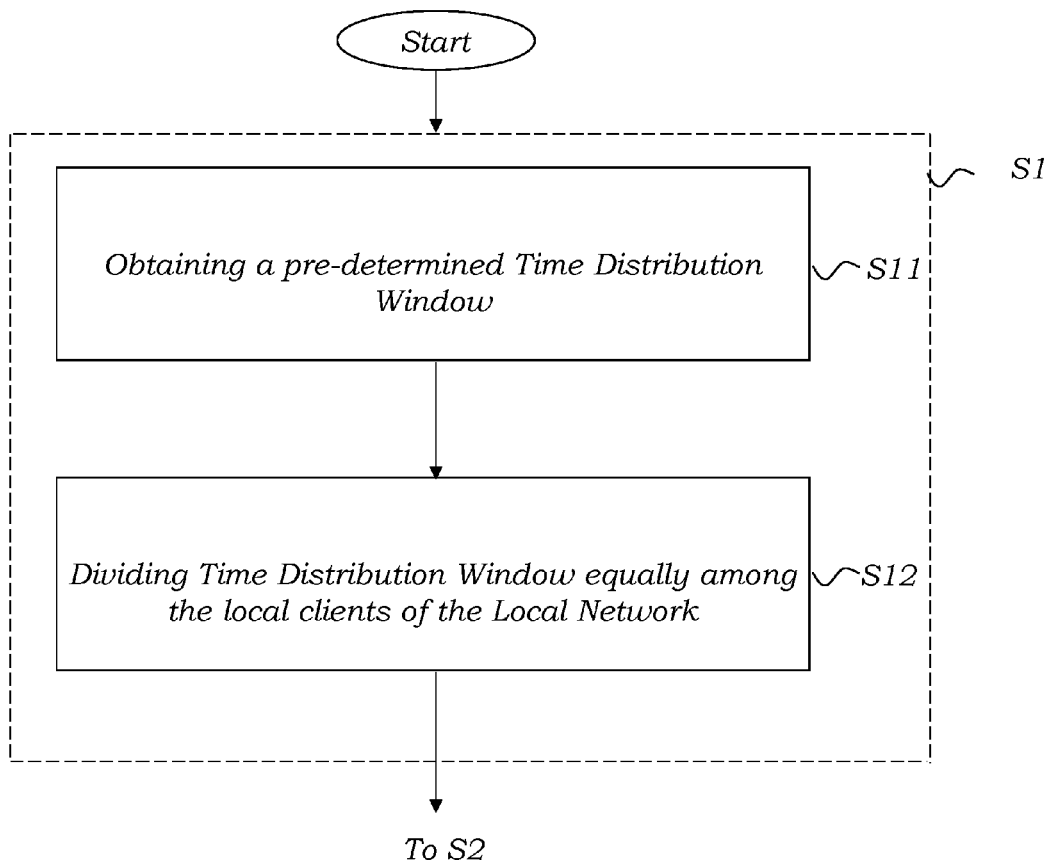
FIG. 3 is a schematic flow diagram illustrating an example of a method to determine a number of frame transmission time slots according to an embodiment.

FIG. 3 is a schematic flow diagram illustrating an example of a distributed frame transmission method according to an embodiment. The method comprises the step S11 of obtaining a pre-determined Time Distribution Window, TDW. This will at least yield information about the length of the TDW. The method also comprises the step of dividing S12 the TDW equally among the local clients 101 of the Local switched Network. In this way a number of equally sized time slots are obtained from the TDW where the number of time slots is in one-to-one correspondence with the number of local clients 101 within the Local switched Network.

The Time Distribution Window, TDW, can be obtained by the local client 101 in several ways. As has been described earlier, in one embodiment, it might be known to the local client 101 in advance, that is, there is provided information relating to the TDW to the local client 101 before the method is initiated. Information about TDW might be stored in a memory within the local client where the memory is accessed upon performing the step S11. Another feasible possibility is that information about the TDW is provided to the local clients within the Local switched Network on a regular basis. That is, a Network administrator may provide the TDW to the local clients 101 regularly, for example once a day. Information regarding TDW is then stored in an accessible memory within each local clients 101. In this way it is possible for the administrator to re-set the value of the Time Distribution Window if new clients are added to, or removed from, the Local switched Network.

Other possibilities are also feasible, i.e., a central unit within the Local switched Network may be configured to generate a TDW and transmit information regarding the generated TDW to the local clients 101 on a regular basis.

In a particular embodiment the step of establishing S2 an ID of the receiving client is performed by using a register comprising a List of Local Addresses that is reachable by the local client 101. Here the local client 101 will compare the destination address of the receiving client with information contained in the List of Local Addresses. In this List of Local Addresses there is provided a mapping between the destination address for a local client 101 in the Local switched Network and an Identity Number, ID. Thus an ID of the receiving client can be established by accessing this List of Local Addresses. The register containing the List of Local Addresses might be stored in a memory within each local client 101 or it might be located outside the local clients 101 in such a way that it can be reached by each of the local clients 101. The switch could for example store the register containing the List of Local Addresses.

Figure 4:
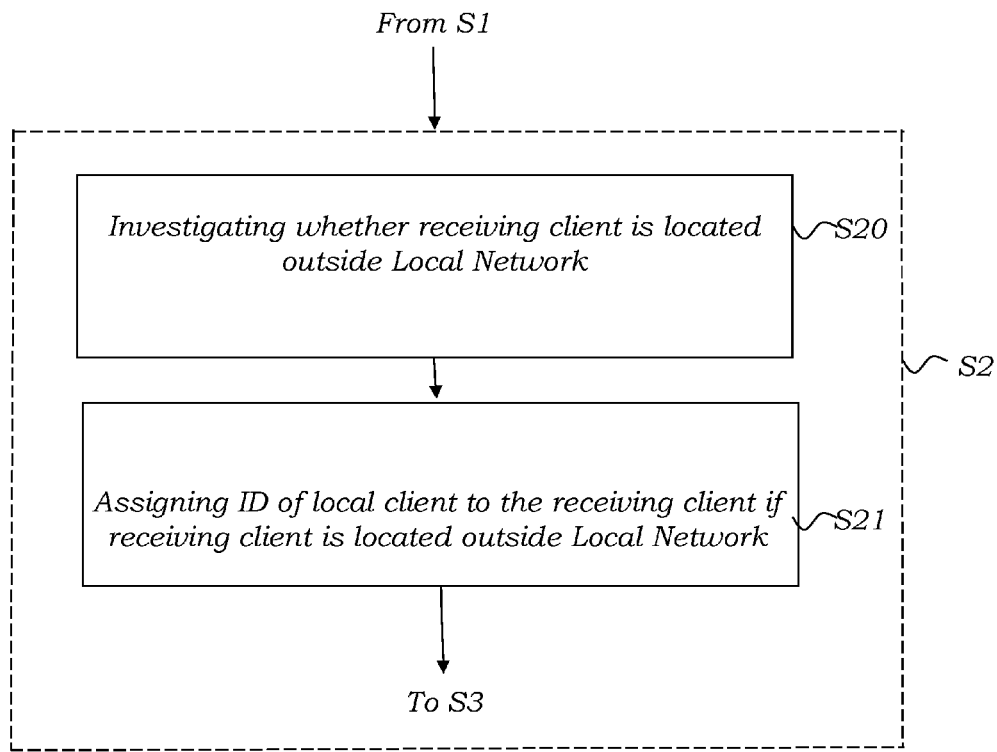
FIG. 4 is a schematic flow diagram illustrating an example of a method to establish an Identity Number, ID, for a receiving client according to an embodiment.

In FIG. 4 there is schematically illustrated an example of method steps to establish S2 an Identity Number, ID, for a receiving client that is a receiving client 104 located outside the Local switched Network. In a method step of investigating S20 it is investigated whether the receiving client is a receiving client 104 located outside the Local switched Network. If such an investigation yields that the receiving client is in fact a receiving client 104 located outside the Local switched Network, a method step of assigning S21 the ID of the transmitting local client 101 to the receiving client 104. In this way an ID of a client 104 located outside of the Local switched Network is established.

Figure 5:
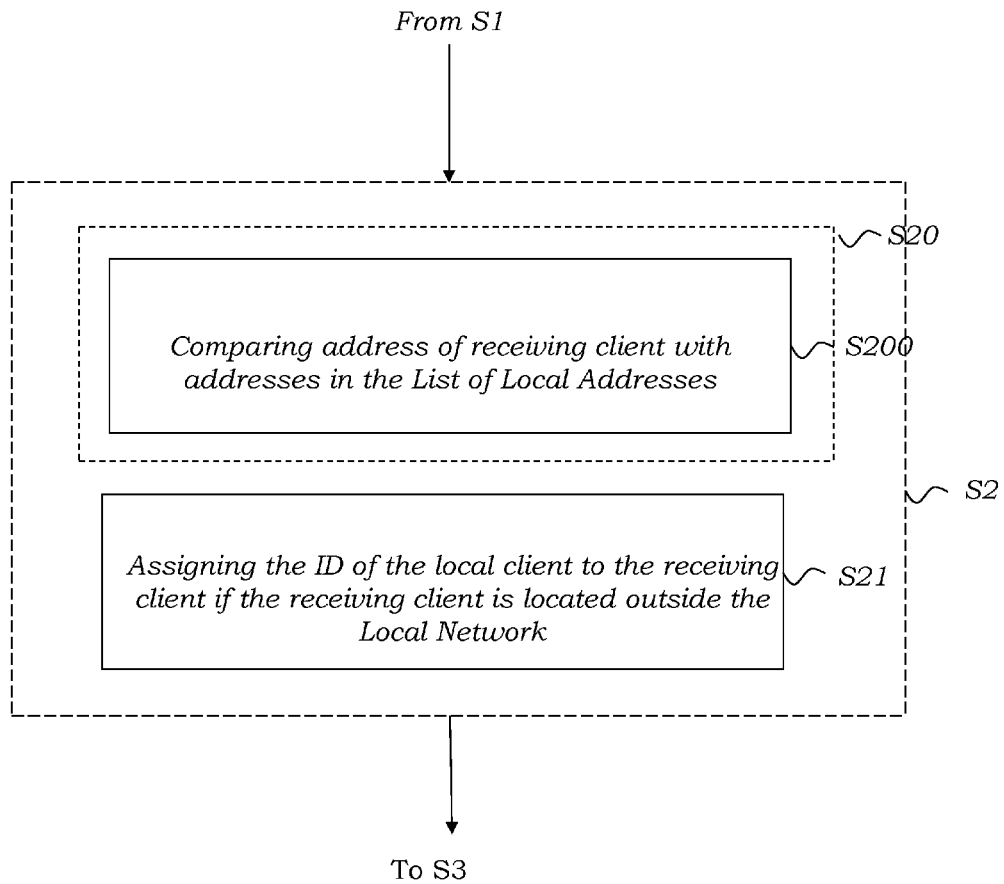
FIG. 5 is a schematic flow diagram showing an example of a method for establishing an ID for a receiving client according to an embodiment.

In one example of an embodiment, illustrated in FIG. 5, is the investigating step S20 performed by means of comparing the destination address of the receiving client with the addresses contained in the List of Local Addresses stored in a register 80 that is reachable by the local client. If the destination address is not found in the List of Local Addresses, the ID of the transmitting local client 101 will be assigned to the receiving client in assigning step S21. This List of Local Addresses is the same as the one described above for the step of establishing S2 an ID of a receiving client.

In this way it is possible to establish an ID for all possible receiving clients, those within the Local switched Network as well as those located outside of the Local switched Network.

Figure 6:
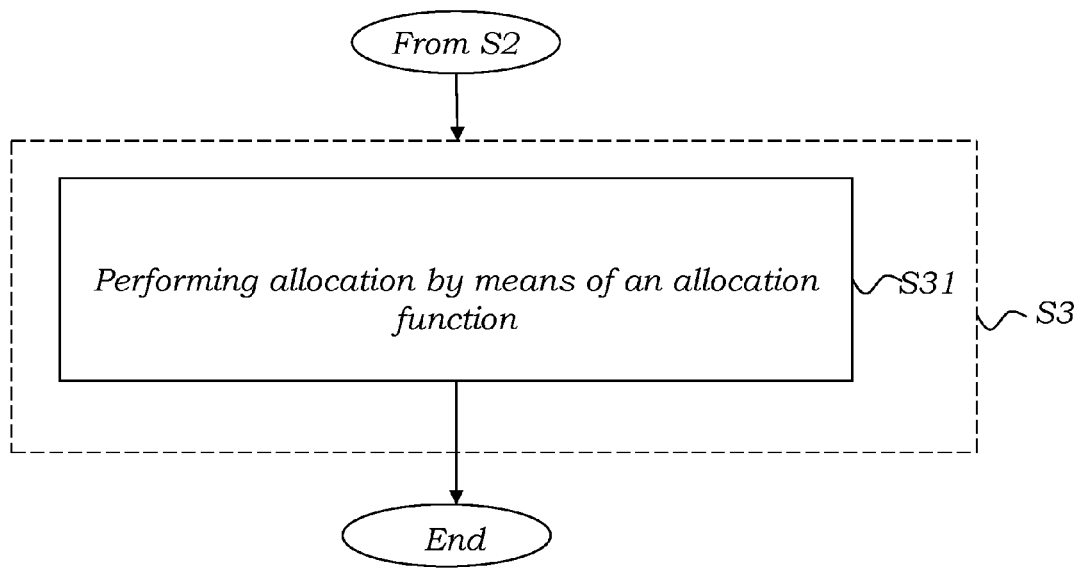
FIG. 6 is a schematic flow diagram showing an example of a method for performing allocation according to an embodiment.

In FIG. 6 is illustrated an example of an embodiment showing the method step of allocating S3 a specific frame transmission time slot among the number of time slots, for transmitting frames to a specific receiving client, from a buffer queue dedicated to the specific receiving client. The step of allocating S3 a frame transmission time slot is based on the established ID of the specific receiving client, the ID of the local client transmitting the frames and the total number of local clients within the Local switched Network.

FIG. 6 illustrates the step of performing S31 allocation by using an allocation function. This allocation function acts to allocate a specific frame transmission time slots to the local client 101 for transmitting frames to a receiving client based on the inputs, the established ID of the specific receiving client, the ID of the local client transmitting the frames and the total number of local clients within the Local switched Network.

In one particular example of an embodiment is the allocation function given by:

$$i = (j+k) \bmod N,$$

Where i denotes time slot number i in the Time Distribution Window, j denotes the ID of the local client, k denotes the established ID of the receiving client and N denotes the total number of local clients in the Local switched Network.

By using this particular allocation function a local client 101 within the Local switched Network will be provided with specific time slots for transmitting frames to a corresponding specific receiving client.

Figure 7:
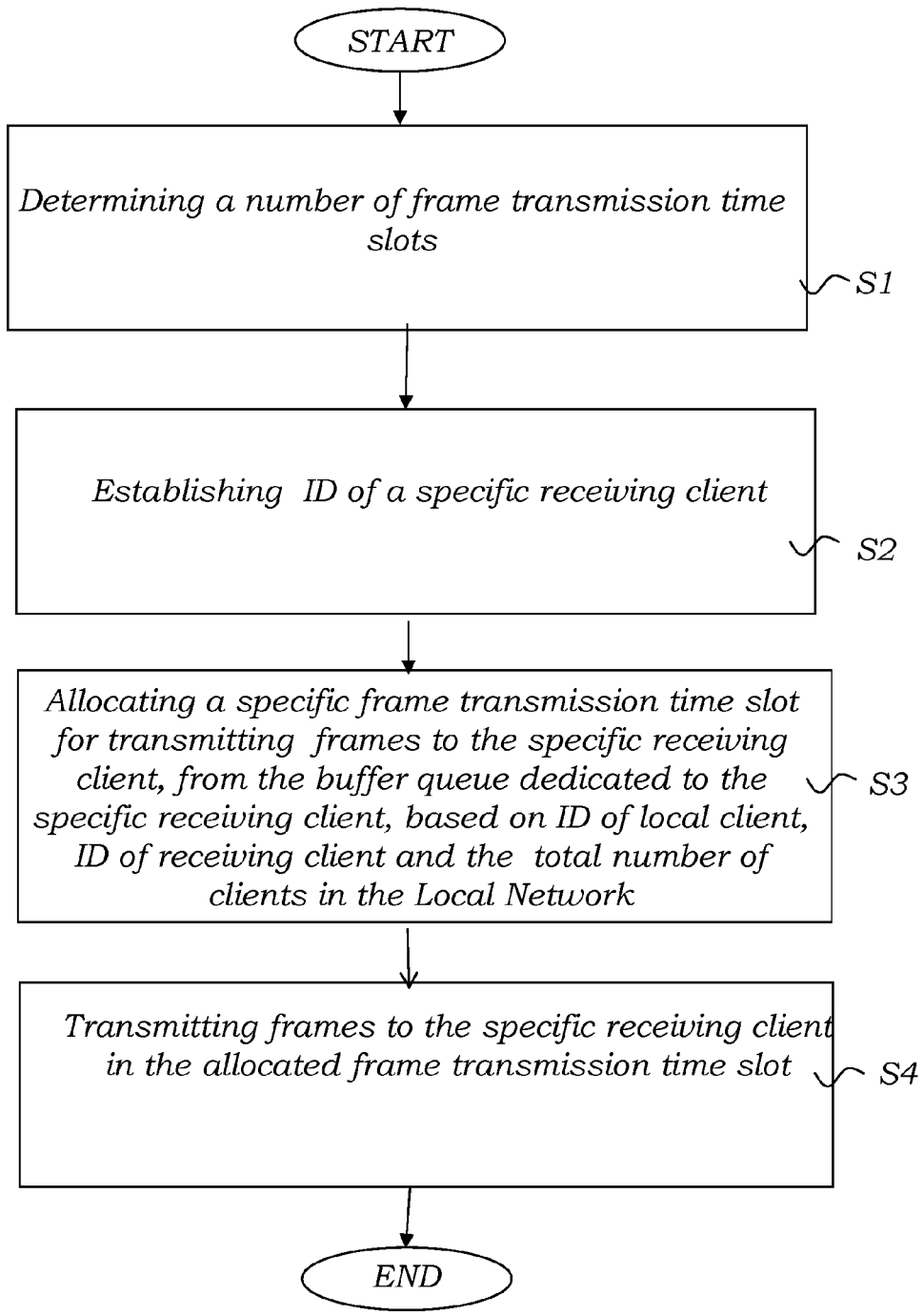
FIG. 7 is a schematic flow diagram showing an example of a method for distributed frame transmission according to an embodiment.

In FIG. 7 is schematically illustrated an example of an embodiment of a distributed frame transmission method where the steps of; determining S1 a number of time slots, establishing an ID of a receiving client and the step of allocating S3 a specific time slot for transmitting frames, from a buffer queue dedicated to the specific receiving client, is followed by the step of transmitting S4 the frames to the specific receiving client.

By way of example, to clarify the steps of the method up to the transmission of the frames, a simplified but hopefully illustrating example will be given. The illustrating example given is only intended to facilitate the understanding and is in no way limiting. To avoid ambiguity in the given example specific embodiments of method steps will be applied. It is however possible to make other combinations of embodiments and still arrive at a distributed frame transmission scheme.

Figure 22:
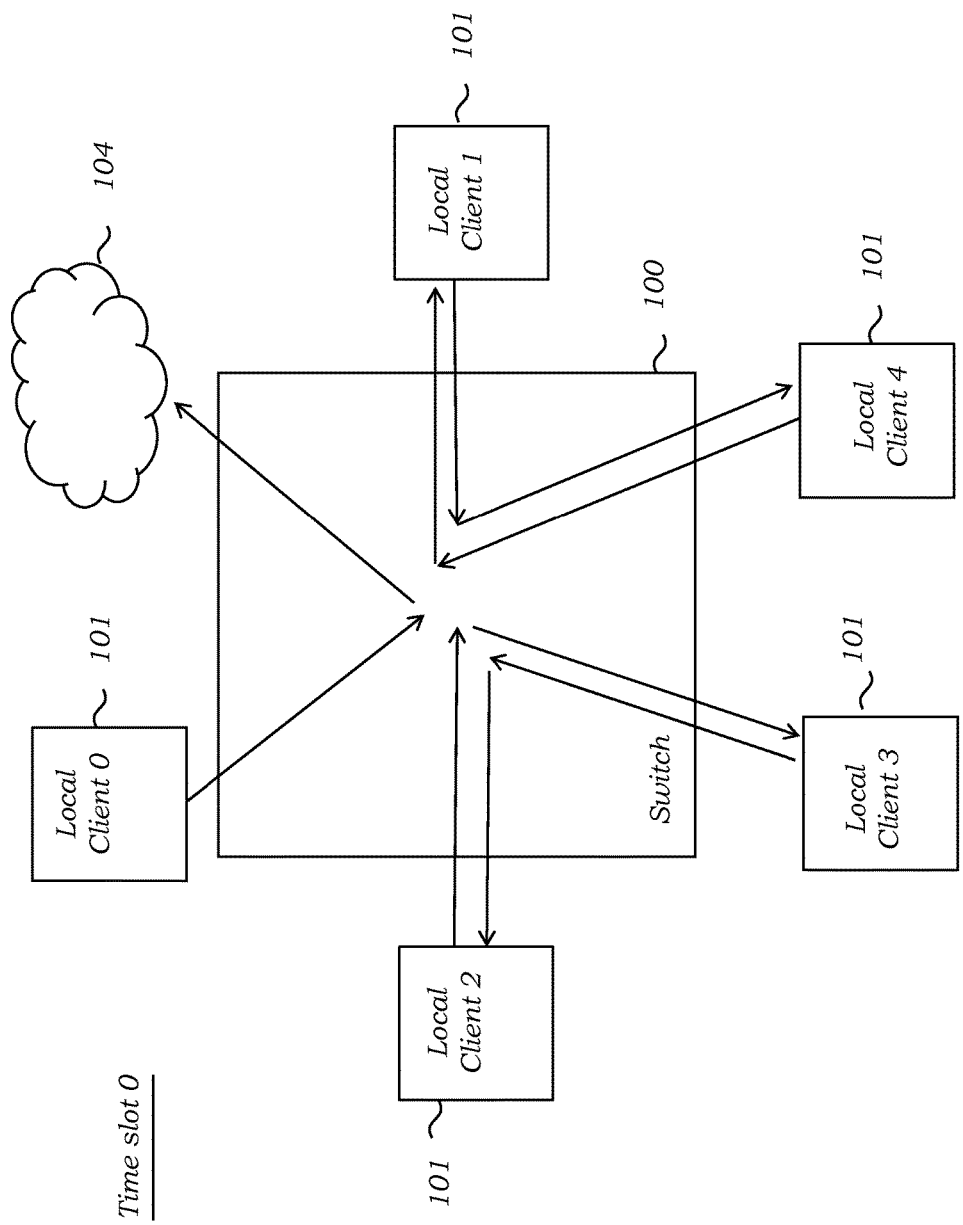
FIG. 22 is a diagram illustrating an example of distributed frame transmission in a Local switched Network according to an embodiment.

In this simplified example reference is made to FIG. 22. In FIG. 22 there is illustrated a Local switched Network, such as a switched Ethernet Network. The Local switched Network comprises five local clients 101, referred to as local client 0 to local client 4, one switch 100 and also receiving clients located outside the Local switched Network. These latter receiving clients are symbolized with reference numeral 104 in FIG. 22.

Each of the five local clients 101 can transmit frames to receiving clients located within the Local switched Network or to receiving clients 104 located outside of the Local switched Network.

According to the proposed distributed frame transmission method the first step is, obtaining S1 a Time Distribution Window, TDW. The TDW could be provided to the local clients 101 in any of the ways described earlier. To be definite we assume that information relating to a TDW is reachable to the local client, i.e. stored in an accessible memory provided in each of the local clients 101. We shall further assume, for simplicity, that the TDW is 500 microseconds long. In this particular example we now have the information needed to perform the step of determining S1 a number of frame transmission time slots. One possible way, as described earlier, is to divide the TDW equally among the local clients 101 within the Local switched Network. In this case there are 5 local clients and thus each frame transmission time slot will be 100 micro seconds long.

In what follows we take the point of view of the local client 101 referred to as local client 0. For simplicity we will also identify the 0 with the ID of the local client. That is, in this example, local client 0 has ID 0.

Figure 23:
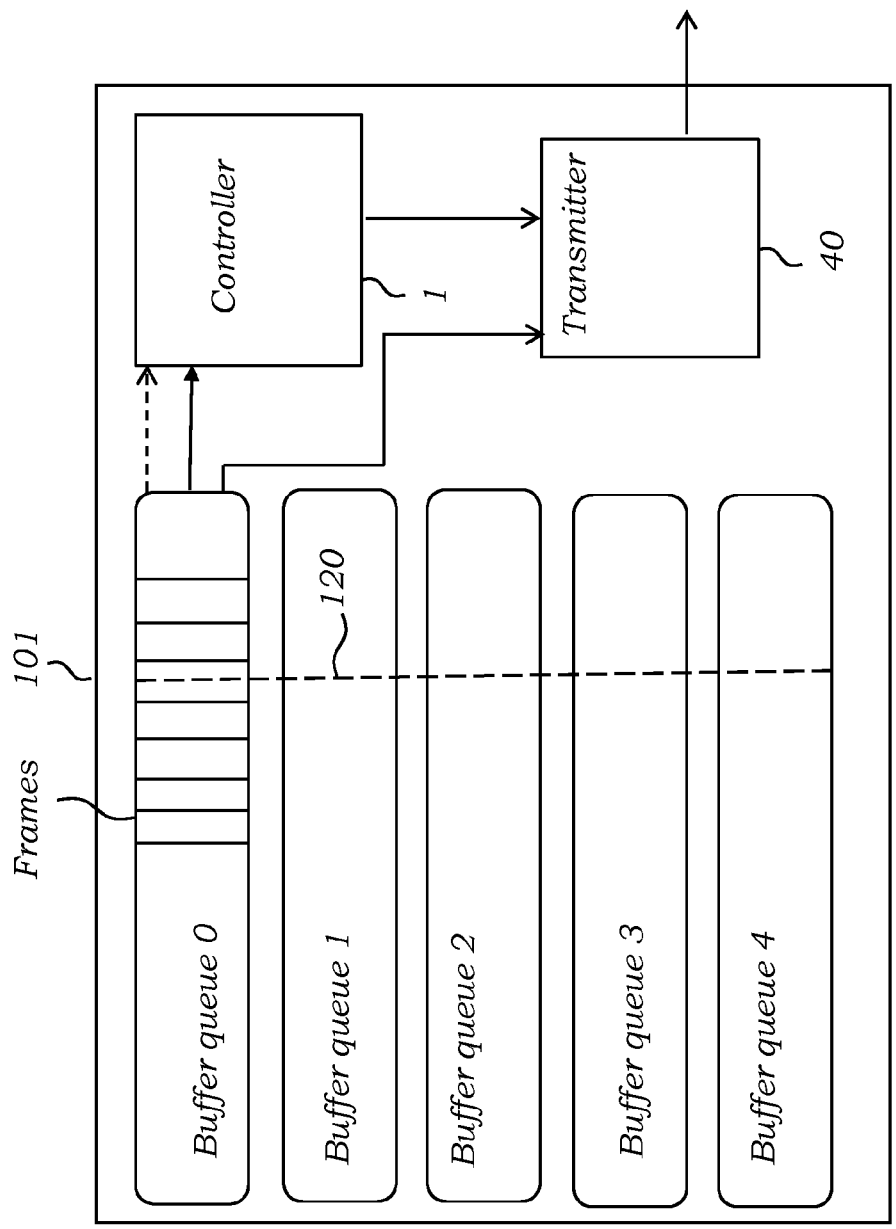
FIG. 23 is a block diagram illustrating a local client for distributed frame transmission of frames from dedicated buffer queues.

Local client 0 comprises a number of frame containing buffer queues, each specific buffer queue contains frames that are to be transmitted to a specific receiving client. That is, the local client 0 stores frames to be transmitted to a specific receiving client in a corresponding buffer queue dedicated to said specific receiving client. All frames to be transmitted to receiving clients 104 located outside of the Local switched Network are however stored in a single dedicated buffer queue. This is illustrated schematically in FIG. 23.

In the method step of establishing S2 an ID of a receiving client, any of the earlier mentioned possibilities can be utilized. Assume in this particular example that the IDs have been obtained by using a List of Local Addresses contained in a register 80 reachable by each of the local clients 101.

To be concrete we assume that the established IDs for each of the receiving clients within the Local switched Network corresponds to the reference they are given in FIG. 22, that is local client 1 has ID 1, local client 2 has ID 2 etc. Furthermore, each receiving client 104 located outside the Local switched Network are assigned the same ID as the transmitting local client within the Local switched Network as per assigning step S21. In this particular example local client 0 will thus establish ID 0 for a receiving client located outside the Local switched Network. Equivalently local client 1 will assign ID 1; local client 2 will assign ID 2, etc., to receiving clients located outside the Local switched Network.

In the method step of allocating S3 a specific frame transmission time slot for transmitting frames to a specific receiving client from the buffer queue dedicated to said specific receiving client, assume that the allocator function:

$i=(j+k) \bmod N$, is used. As stated earlier, in this allocator function i is denoting time slot number i in the Time Distribution Window, j is denoting the ID of the local client, k is denoting the established ID of the receiving client and N is denoting the total number of local clients in the Local switched Network.

In the present example there will be five time slots 0, 1, 2, 3 and 4, all being 100 microseconds long.

Letting the local client 0 perform the step of allocating S3 by the step of performing S31 allocation by means of the allocator function for all receiving clients the following time slot schedule will be obtained:

TABLE 1

| ID | Time slot 0 | Time slot 1 | Time slot 2 | Time slot 3 | Time slot 4 |
|---|---|---|---|---|---|
| 0 | 0* (outside) | 1 | 2 | 3 | 4 |

So the local client 0 in the Local switched Network has thereby been provided with a distributed specific frame transmission time slot for transmitting frames to a specific receiving client. Hence in the first time slot 0, local client 0 is set to transmit frames to receiving clients located outside of the Local switched Network, this is indicated in the table by means of 0*(outside). In time slot 1, the local client is set to transmit frames to receiving client 1, etc.

If all five local clients within the Local switched Network use the allocator function the following table will be generated:

TABLE 2

| ID | Time slot 0 | Time slot 1 | Time slot 2 | Time slot 3 | Time slot 4 |
|---|---|---|---|---|---|
| 0 | 0* (outside) | 1 | 2 | 3 | 4 |
| 1 | 4 | 0 | 1* (outside) | 2 | 3 |
| 2 | 3 | 4 | 0 | 1 | 2* (outside) |
| 3 | 2 | 3* (outside) | 4 | 0 | 1 |
| 4 | 1 | 2 | 3 | 4* (outside) | 0 |

So in this particular simplified example there is generated a frame transmitting schedule where in the first time slot 0, local client 0 transmit frames to receiving client located outside the Local switched Network, local client 1 transmit frames to local client 4 within the Local switched Network, local client 3 transmit frames to local client 2 within the Local switched Network, local client 2 transmit frames to local client 3 within the Local switched Network and finally local client 4 transmit frames to local client 1 within the Local switched Network. This is schematically illustrated in FIG. 22.

In the next time slot, time slot 1, another transmission sequence is obtained. In the end of the Time Distributed Window each local client 101 has been able to send frames to a specific receiving client.

Figure 8:
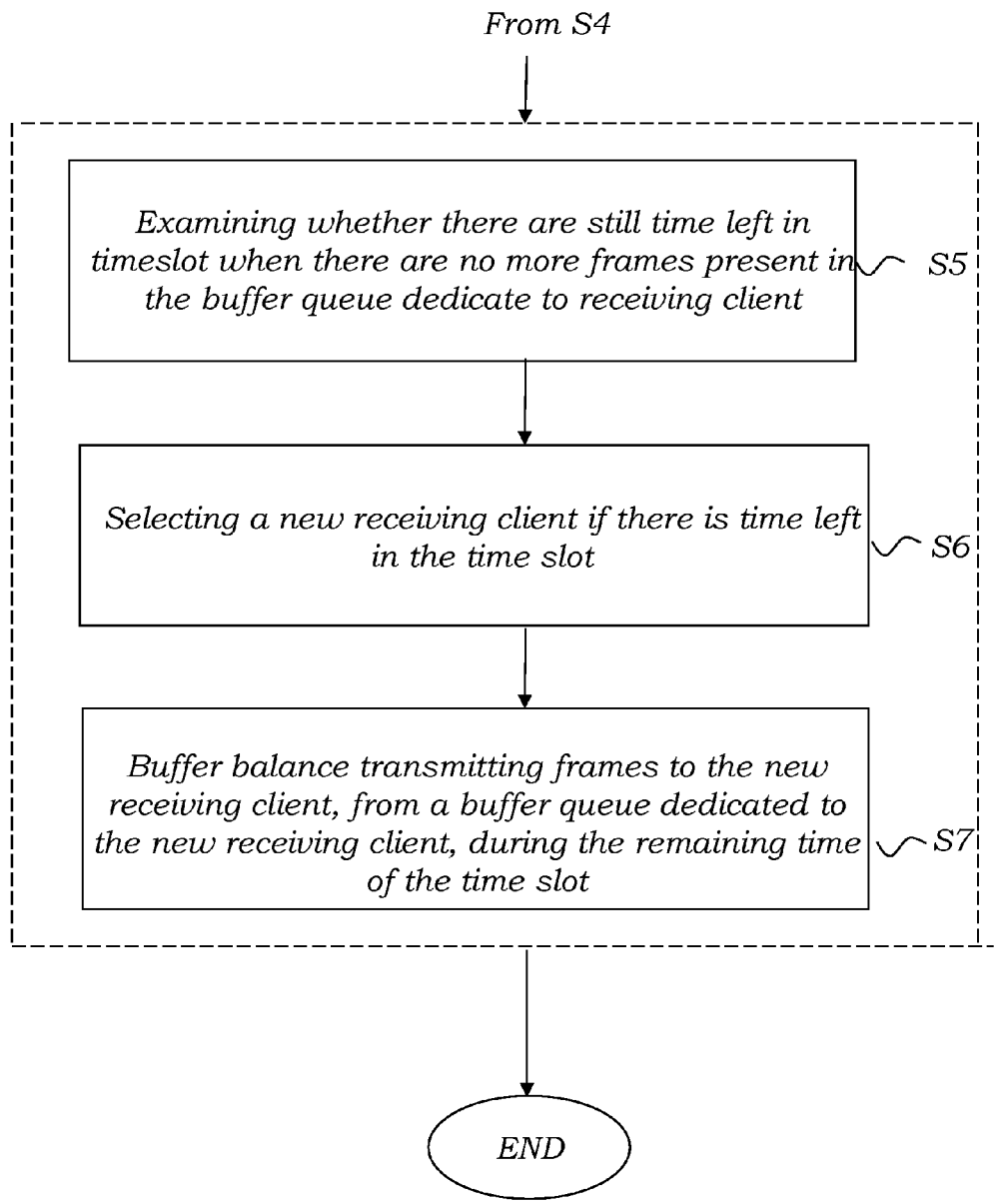
FIG. 8 is a schematic flow diagram showing an example of a method for performing a buffer balancing transmission according to an embodiment.

In FIG. 8 is schematically illustrated an example of an embodiment of a distributed frame transmission method where a more efficient use of the allocated time slots is proposed. As has been explained earlier, a local client 101 transmits frames to a specific receiving client in an allocated time slot for this receiving client from a buffer queue dedicated to this specific receiving client. There might be occasions where all frames in the dedicated buffer have been transmitted before the allocated time slot has ended. In this case there will be some idle time for the transmitting local client 101. To make use of this unused time further method steps are proposed.

To provide for a more efficient use of the allocated time slots an example of an embodiment of the distributed frame transmission method further comprises a step of examining S5 whether there are still time left in the time slot when there are no more frames to transmit present in the buffer queue dedicated to the receiving client. There is also a step of selecting S6 a new receiving client if there is still time left in the time slot, and a step S7 of buffer balancing transmitting frames to the selected new receiving client from the buffer queue dedicated to the selected new receiving client during the remaining time in the time slot.

In this embodiment the whole length of the time slot is used for transmitting frames.

Figure 9:
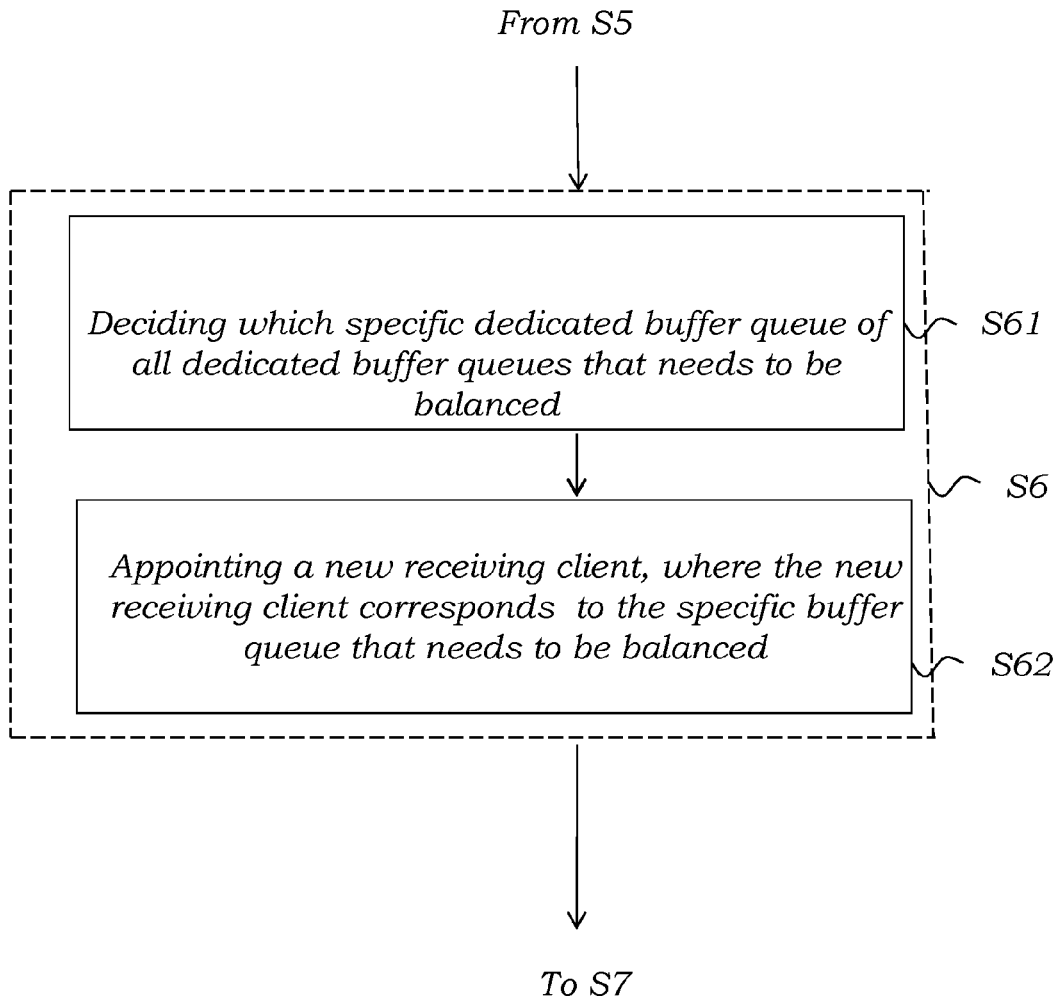
FIG. 9 is a schematic flow diagram showing an example of the method step of selecting a new receiving client according to an embodiment.

In FIG. 9 there is a schematic diagram illustrating an example of the method step S6 of selecting a new receiving client if there is still time left in the time slot. In this example the step S6 of selecting a new receiving client comprises the step of S61 deciding which specific dedicated buffer queue of all dedicated buffer queues that needs to be balanced and the step of appointing S62 a new receiving client where the new receiving client corresponds to the receiving client whose specific dedicated buffer queue needs to be balanced.

With the term "balanced" in the embodiment above is intended that a buffer queue that contain frames to be transmitted from the local client 101 does not contain an amount of frames that might lead to that the buffer queue will be overloaded.

The above described method steps, leading to a buffer balance transmission of frames, provides for a method that efficiently utilizes the entire accorded time in the allocated time slot for transmission.

Figure 11:
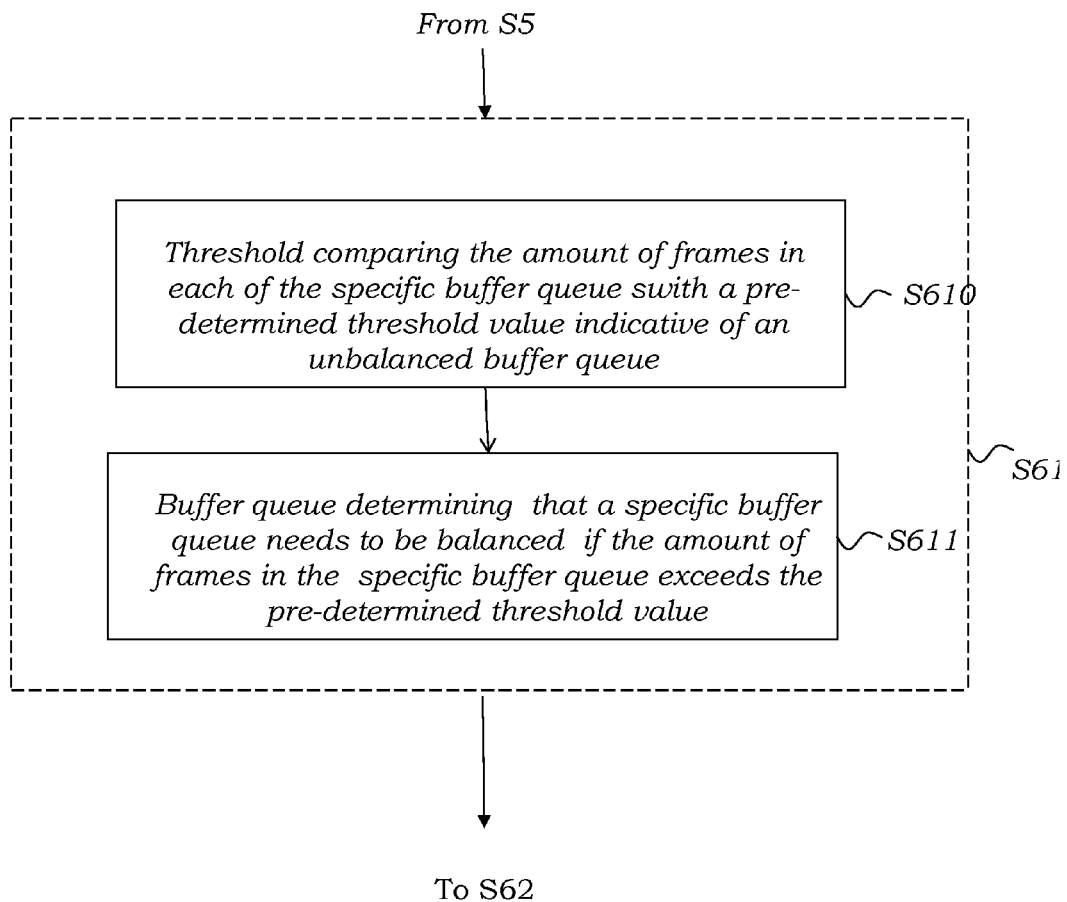
FIG. 11 is a schematic flow diagram showing an example of an embodiment for selecting a new receiving client.

FIG. 11 is a schematic diagram illustrating an example of a frame distribution method. The method comprises the step of threshold comparing S610 the amount of frames in a specific buffer queue with a pre-determined threshold value that is indicative of an unbalanced buffer queue. The method also comprises the step of buffer queue determining S611 that a specific buffer queue needs to be balanced if the amount of frames in the specific buffer queue exceeds the pre-determined threshold value.

In the above given embodiment a pre-determined threshold value is used as a measure for determining whether a buffer queue needs to be balanced. This threshold value is accessible to the local client 101. It could for example be stored in a memory in the local client.

Figure 10:
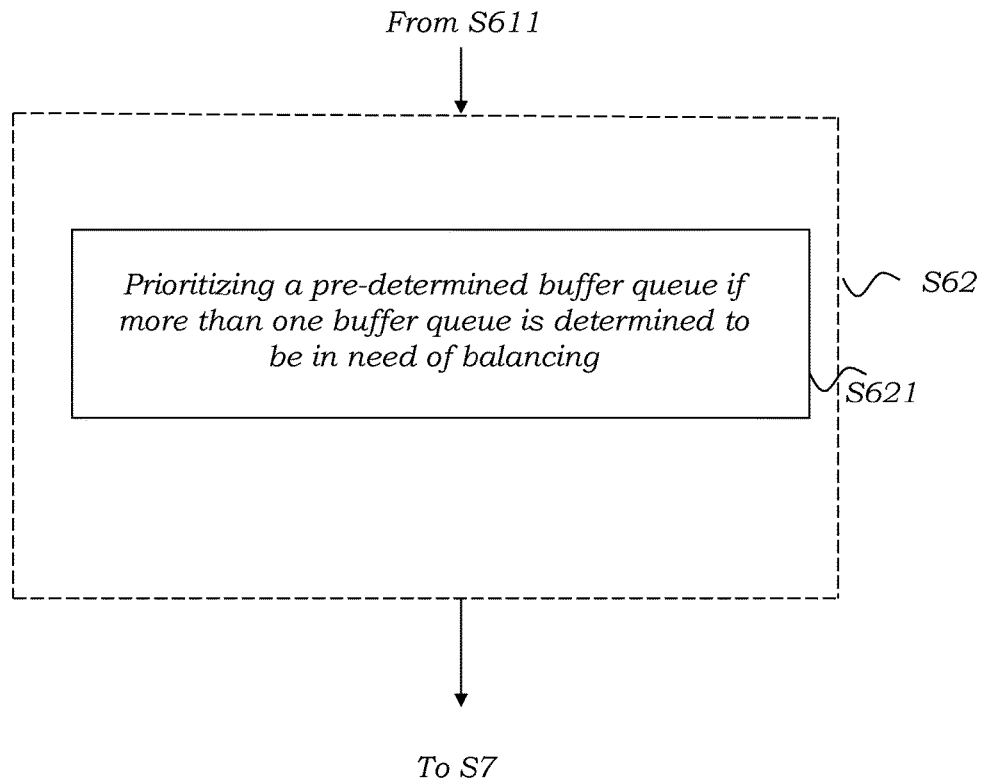
FIG. 10 is a is a schematic flow diagram showing an example of the method step of prioritizing a particular buffer queue according to an embodiment.

An example of an embodiment related to the method step S611 described above is followed by the step of appointing S62 a new receiving client that corresponds to a buffer queue that needs to be balanced which utilizes a further step of prioritizing 621 a pre-determined buffer queue if more than one buffer queue is determined to be in need of balancing in the buffer queue determining step S611. This step 621 of prioritizing is illustrated schematically in FIG. 10.

In this way a simple hierarchical distributed frame transmission method is obtained wherein the local client will utilize the accorded time efficiently to transmit frames to prioritized local clients while keeping all the buffer queues at an appropriate level.

One possible example of an embodiment for performing the step of prioritizing S621, is to prioritize the buffer queue that corresponds to the receiving client that has the time slot in the Time Distribution Window that is farthest away from the time slot in which the local client is transmitting. This will reduce the risk that the buffer queue farthest away will be saturated before a frame transmission can be performed.

Another example of an embodiment of a distributed frame transmission method comprises the step of prioritizing S621 the buffer queue corresponding to a receiving client located outside the Local switched Network.

Since the buffer queue dedicated to receiving clients located outside the Local switched Network contains frames to all receiving clients located outside the Local switched Network, a good measure is to balance this buffer queue first if there is intensive traffic between the local client and the receiving clients located outside the Local switched Network is intensive.

In a possible example of an alternative embodiment of the distributed frame transmission method, the step S5 of examining whether there is still time left in the time slot could be followed by a step S5' of checking whether any of the dedicated buffers require buffer balancing. Alternatively stated, after the step S5 of examining whether there is still time left, but before the step of S6 selecting a new receiving client the method could comprise a step S5' of checking if any of the buffer queues at all needs to be balanced. If it is decided that no buffer queues are in need of buffer balancing the transmission step may be implemented to rest until the next time slot. In this particular example the step S6 of selecting a new receiving client may only be activated if is decided that at least one of the dedicated buffer queues are in need of buffer balancing. This step S5' of checking if any buffer queues are in need of a balancing could for example be performed by means of threshold comparing as described above. That is, the step S5' of checking if any buffer needs to be balanced compares the amount of frames in the buffer queues with a pre-determined threshold value that is indicative of the need of buffer balancing. All consecutive steps according to the distributed frame transmission method can follow this alternative checking step.

By way of example, to clarify the steps of the method up to the buffer balance transmission of the frames, a simplified but hopefully illustrating example will be given. The illustrating example given is only intended to facilitate the understanding and is in no way limiting. To avoid ambiguity in the given example specific embodiments of method steps will be applied. It is however possible to make other combinations of embodiments and still arrive at a distributed frame transmission scheme.

In this example reference is made to FIG. 22. The circumstances will be the same as the example used earlier. That is, assume that there are five local clients 101 within a Local switched Network. The local clients 101 can communicate with each other and with receiving clients 104 located outside the Local switched Network through the switch. Further assume, in this particular example, that the same transmission schedule has been generated as given in Table 1. In what follows we will take the point of view of local client 0 in the Local switched Network.

In this particular example the following distributed frame transmission scheme has been allocated to the local client 0:

TABLE 1

| ID | Time slot 0 | Time slot 1 | Time slot 2 | Time slot 3 | Time slot 4 |
|---|---|---|---|---|---|
| 0 | 0* (outside) | 1 | 2 | 3 | 4 |

The meaning of the entries in the table has been described earlier. Assume that we are in time slot 2, that is, the local client 0 is set to transmit a number of frames to receiving client 2. To illustrate the steps of examining S5, selecting S6 and buffer balance transmitting S7 frames described above we will give a simplified example wherein we will use a particular combination of method steps. This however only constitutes an embodiment of a single combination that is given to get a quick guidance. Other combinations are possible.

In time slot 2 the local client 0 sends a number of frames to receiving client 2. We will assume in this example that the number of transmitted frames are low so that the transmission has been completed within a sub-portion of the allocated time slot. To utilize the remaining time in the time slot the local client will, when the transmission has been completed, perform the step S5 of examining whether there is time still left in the time slot when the transmission is completed. If this is the case, as in the following example, the local client 0 will perform the step S6 of selecting a new receiving client. When the new receiving client has been selected, frames from the buffer queue dedicated to this specific new receiving client will be transmitted during the remaining time in time slot 2.

To further illustrate, assume that: i) there is time left in time slot 2, ii) that the number of frames in the buffer queue dedicated to local client 3 is above a threshold value, and iii) that the number of frames in the buffer queue dedicated to receiving clients located outside of the Local switched Network is above a pre-determined threshold value that can be accessed by local client 0.

With these particular conditions the local client 0 will first perform the step S5 of determining whether there is still time left in the time slot. After this the step S6 selecting a new receiving client will be performed, in this step the amount of frames in the buffer queues will be compared with a pre-determined threshold value in the step of threshold comparing S610. In the particular example at hand the threshold comparing step S610 will show that two buffer queues dedicated to specific receiving clients will lie above the pre-determined threshold value. To distinguish which one of these receiving clients that the buffer balancing transmitting step S7 shall be applied the local clients performs the step of prioritizing S621 a specific receiving client. To be definite, the local client might be configured to prioritize a receiving client that is located outside the Local switched Network. If this is the case in the example at hand the local client 0 will perform the step S7 of buffer balancing transmitting frames to receiving clients located outside the Local switched Network during the remaining time in time slot 2.

In the method of distributed frame transmission as described the number of local clients within the Local switched Network that is used in the method steps of i) determining S1 a number of frame transmission timeslots and ii) allocating S3 a time slot among the number of time slots may correspond to the total number of connected local clients within the Local switched network. That is the number of local clients in the Local switched Network that are electronically connected to the switch. Or, in an alternative formulation, those local clients that are capable of transmitting frames or receiving frames or both. By not counting inactive local clients that are not electronically connected to the switch, an efficient use of the Time Distribution Window can be obtained.

Furthermore, the method of distributed frame transmission as described may be performed in a Local switched Network that is a Local switched Ethernet Network and wherein the frames to be transmitted are Ethernet frames.

Since the method is intended to be implemented in a local client in a Local switched Network it might be necessary to have a well-functioning level of clock synchronization for all the local clients and the switch. Such clock synchronization of the local clients and the switch in the Local switched Network can be provided in a variety of ways by various known means. One possible way may be to let the switch dictate the time system and broadcast the time to the local clients within the Local switched Network. In this way the local clients will continuously update their local time to thereby obtain a high level of time synchronization within the Local switched Network. It is however foreseeable to use any possible means of obtaining effective time synchronization between the clients in the Local switched Network.

The steps, functions and procedures described above with regard to a distributed frame transmission method may be implemented in hardware using conventional technology, including discrete circuit or integrated circuit technology and including both electronic circuitry and application specific circuitry.

At least some of the steps and functions described above may be implemented in software for execution by a suitable computer of processing device such as a microprocessor and/or programmable logic devices. It is also possible to re-use existing software in the local client, i.e. reprogramming existing software to perform the steps and functions. Alternatively new software components can be added to the existing ones, where this added components perform the steps and functions described.

According to another aspect of the proposed technology there is provided a controller 1 for controlling a distributed frame transmission method in a Local switched Network such as a Local switched Ethernet Network.

Figure 12:
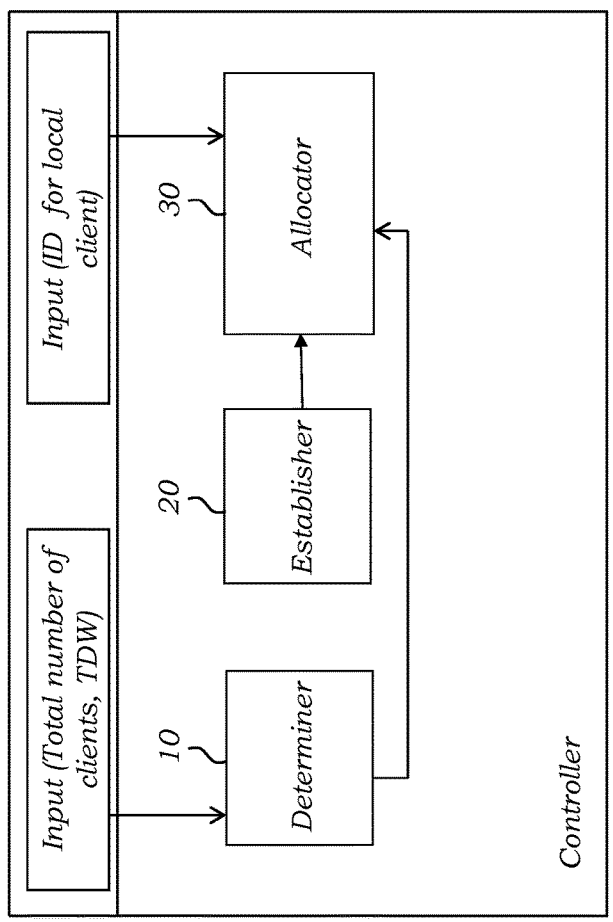
FIG. 12 is a schematic block diagram illustrating an example of a controller for distributed frame transmission according to an embodiment.

FIG. 12 is a block diagram illustrating an example of a controller for distributed frame transmission for a local client in a Local switched Network. The controller 1 comprises a determiner 10 configured to determine a number of frame transmission time slots based on the number of local clients in the Network and a Time Distribution Window (TDW). The controller 1 further comprises an establisher 20 that is configured to establish an ID of a specific receiving client and an allocator 30 that is configured to allocate a specific frame transmission time slot among the number of frame transmission time slots for transmitting frames to the specific receiving client from a buffer queue dedicated to the specific receiving client based on an ID of the local client, the ID of the receiving client and the total number of local clients in the Local switched Network.

In the controller 1 the determiner 10 may be communicating with the allocator via a conventional data path. The establisher 20 may also be communicating with allocator 30 through a conventional data path.

Figure 13:
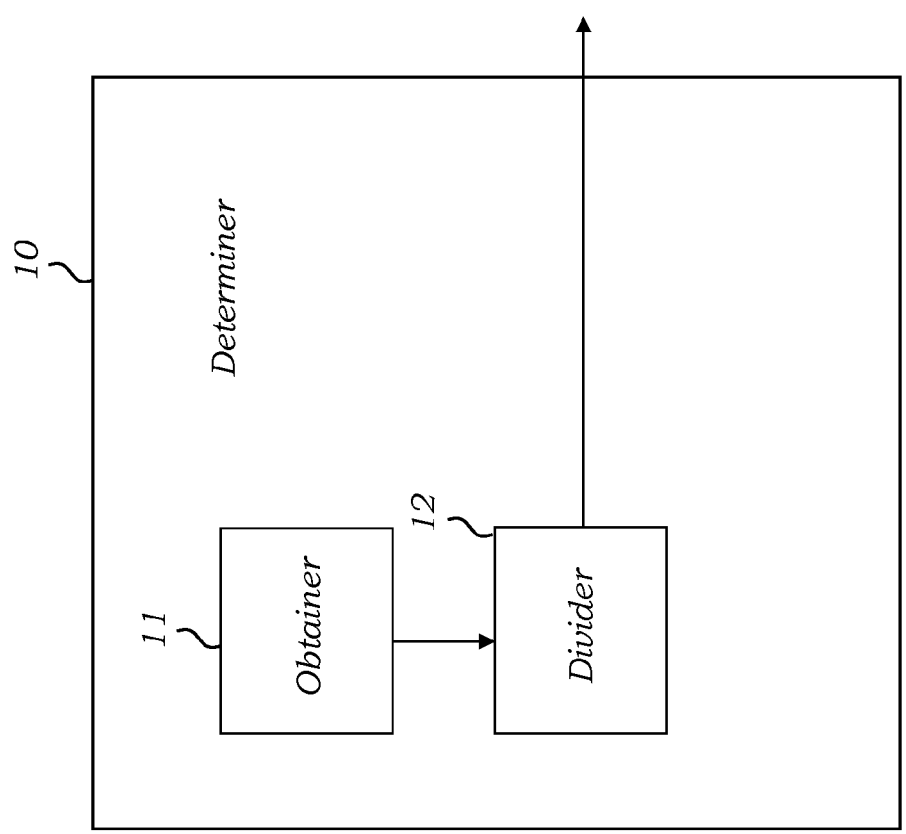
FIG. 13 is a schematic block diagram illustrating an example of a determiner in a controller for determining a number of time slots according to an embodiment.

FIG. 13 is a block diagram illustrating an example of a determiner 10 comprising an obtainer 11 that is configured to obtain a Time Distribution Window and a divider 12 that is configured to divide the Time Distribution Window equally among the local clients of the Local switched Network to obtain a number of equally sized time slots that corresponds to the number of transmitting local clients. The obtainer 11 and the divider 12 are communicating through a conventional data path.

Figure 14:
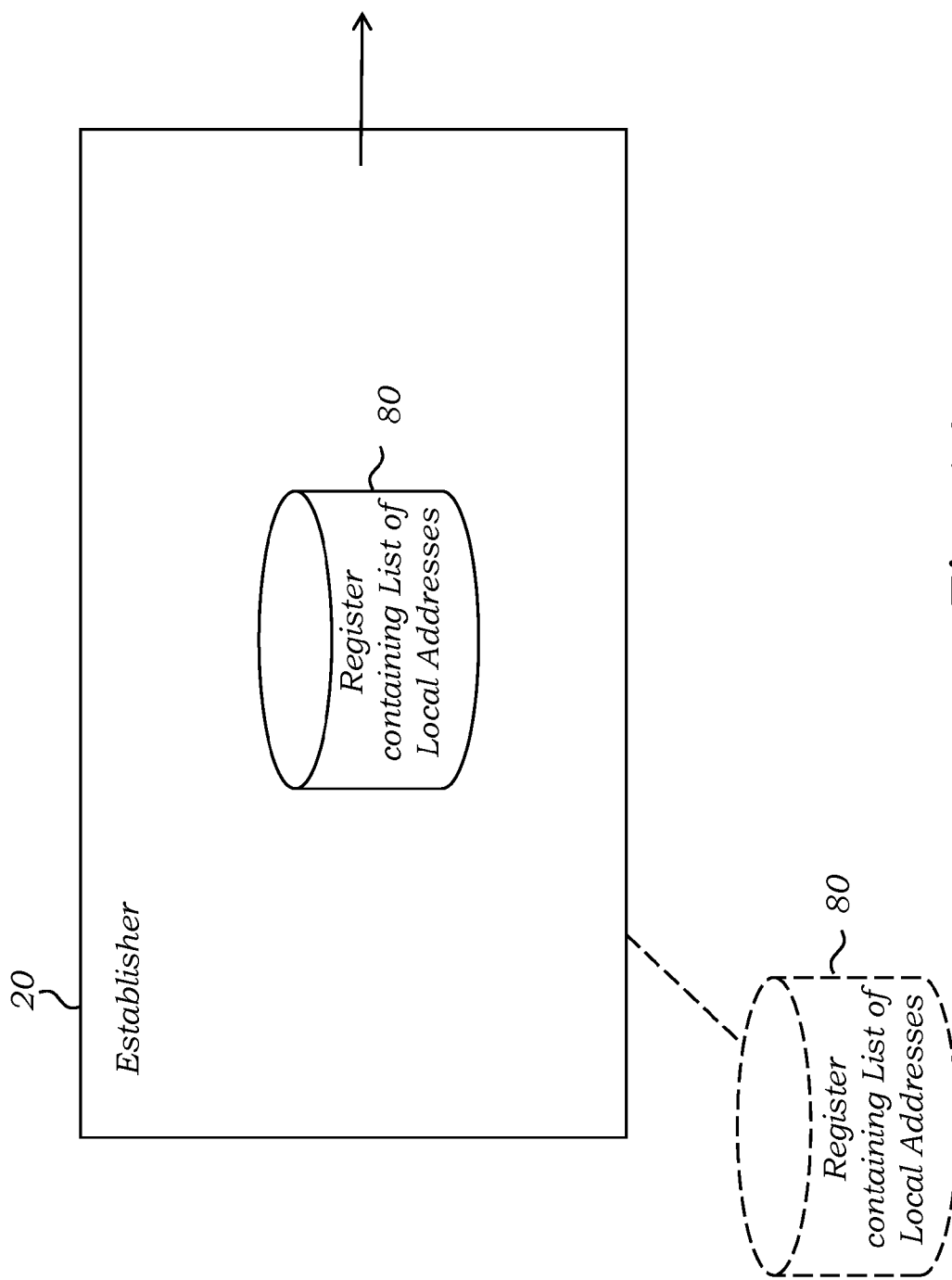
FIG. 14 is a schematic block diagram illustrating an example of an establisher in a controller for establishing an Identity Number, ID, by accessing a List of Local Addresses according to an embodiment.

FIG. 14 is a block diagram illustrating an example of an embodiment of an establisher 20 comprised in a controller 1, the establisher 20 comprises a register 80 that includes a List of Local Addresses. The List of Local Addresses in turn comprises a mapping between the addresses and the IDs of all local clients in the Local switched Network. The establisher 20 in the controller is configured to establish the ID of the receiving client by accessing the register 80. The register 80 could be located in the controller but it could also be arranged outside the controller but accessible to the controller.

Figure 15:
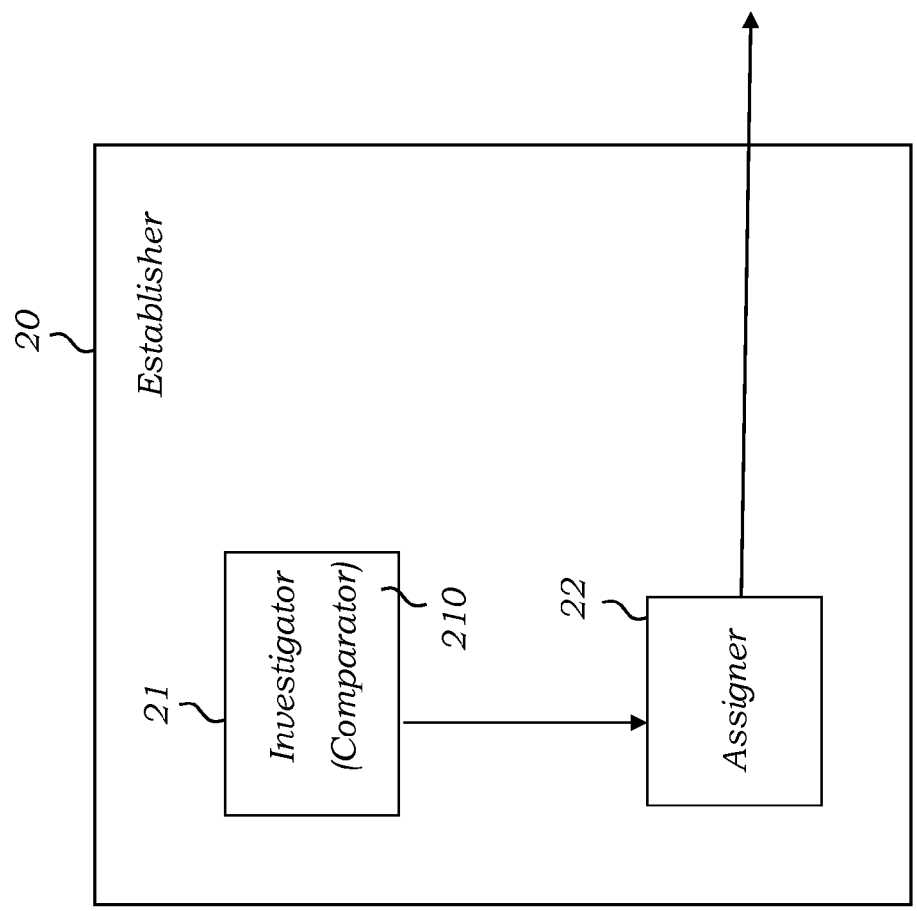
FIG. 15 is a schematic block diagram illustrating an example of an embodiment of an establisher in a controller for investigating whether a receiving client is located outside the switched Network and assigning the receiver an Identity Number.

FIG. 15 is a block diagram illustrating an example of an establisher 20 comprised in a controller 1, the establisher 20 comprises, an investigator 21 that is configured to investigate whether a receiving client is a client located outside the Local switched Network and an assigner 22 that is configured to assign the ID of the local client to the receiving client if the receiving client is found to be located outside the Local switched Network. In FIG. 15 there is also schematically illustrated that the investigator 21 comprises a comparator 210. The comparator is configured to compare the address of the receiving client with addresses included in the List of Local Addresses. The investigator 21 is communicating with the assigner 22 through a conventional data path.

In one possible embodiment of a controller 1 is the allocator 30 configured to allocate the frame transmission time slot for frame transmission by means of an allocator function, $$i=(j+k)\text{Mod } N,$$

where i denote time slot number i in the Time Distribution Window, j denote the ID of the local client, k denote the ID of the receiving client and N denote the total number of Local Clients in the Local switched Network.

According to another aspect of the proposed technology there is provided a local client 101 in a Local switched Network. The local client is provided with devices for performing distributed frame transmission to thereby reduce the strain on the switch buffer. By reducing the strain the number of dropped frames will be reduced. In this way a more robust and efficient Local switched Network is obtained.

Figure 16:
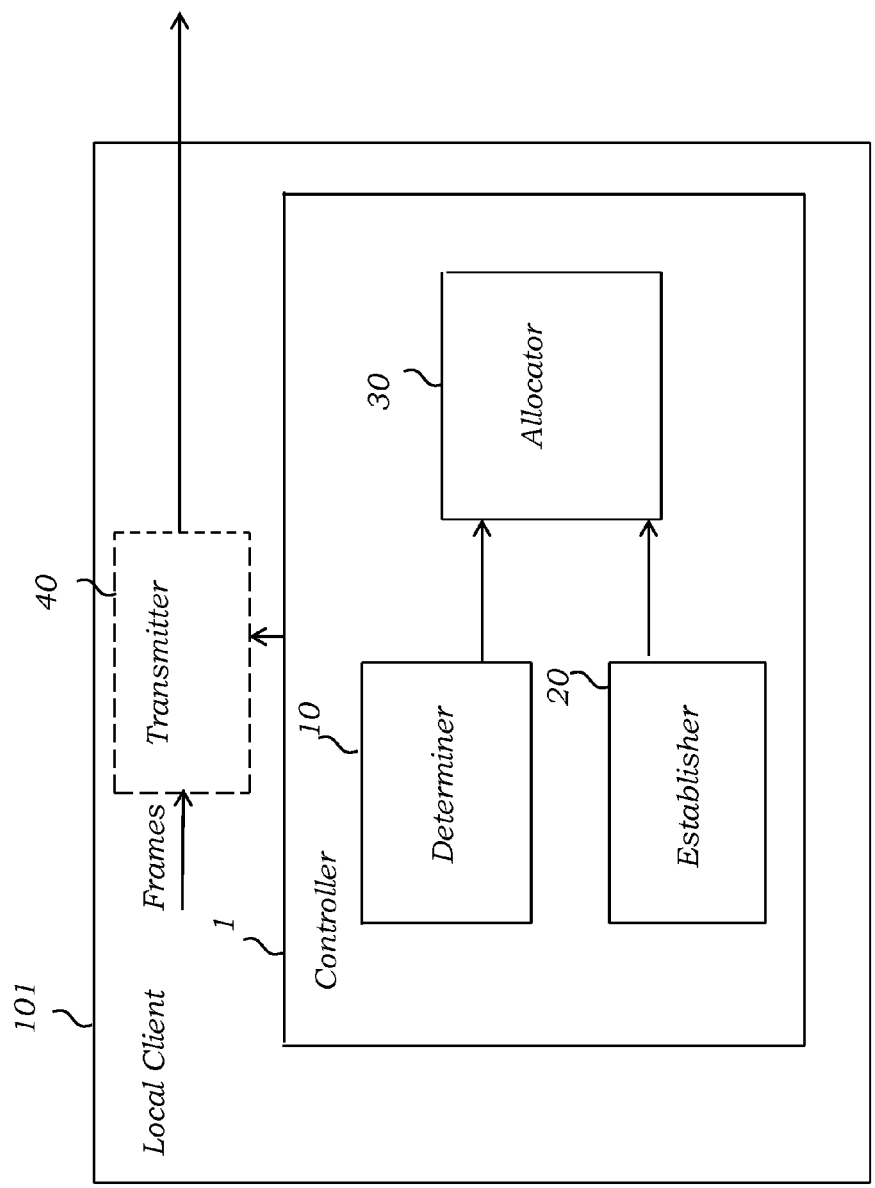
FIG. 16 is a schematic block diagram illustrating a local client for distributed frame transmission according to an embodiment.

FIG. 16 is a block diagram illustrating an embodiment of a local client 101. The local client comprises a determiner 10 configured to determine a number of frame transmission time slots based on the number of local clients in the Network and a Time Distribution Window (TDW). The local client further comprises an establisher 20 that is configured to establish an ID of a specific receiving client and an allocator 30 that is configured to allocate a specific frame transmission time slot among the number of frame transmission time slots for transmitting frames to the specific receiving client, from a buffer queue dedicated to the specific receiving client, based on an ID of the local client, the ID of the receiving client and the total number of local clients in the Local switched Network. The determiner 10 may be communicating with the allocator through a conventional data path. Also the establisher 20 may be communicating with the allocator 30 through a conventional data path.

Shown in FIG. 16 is also a transmitter 40 that may be communicating with the controller 1 comprising the determiner 10, the establisher 20 and the allocator through a conventional data path.

Figure 17:
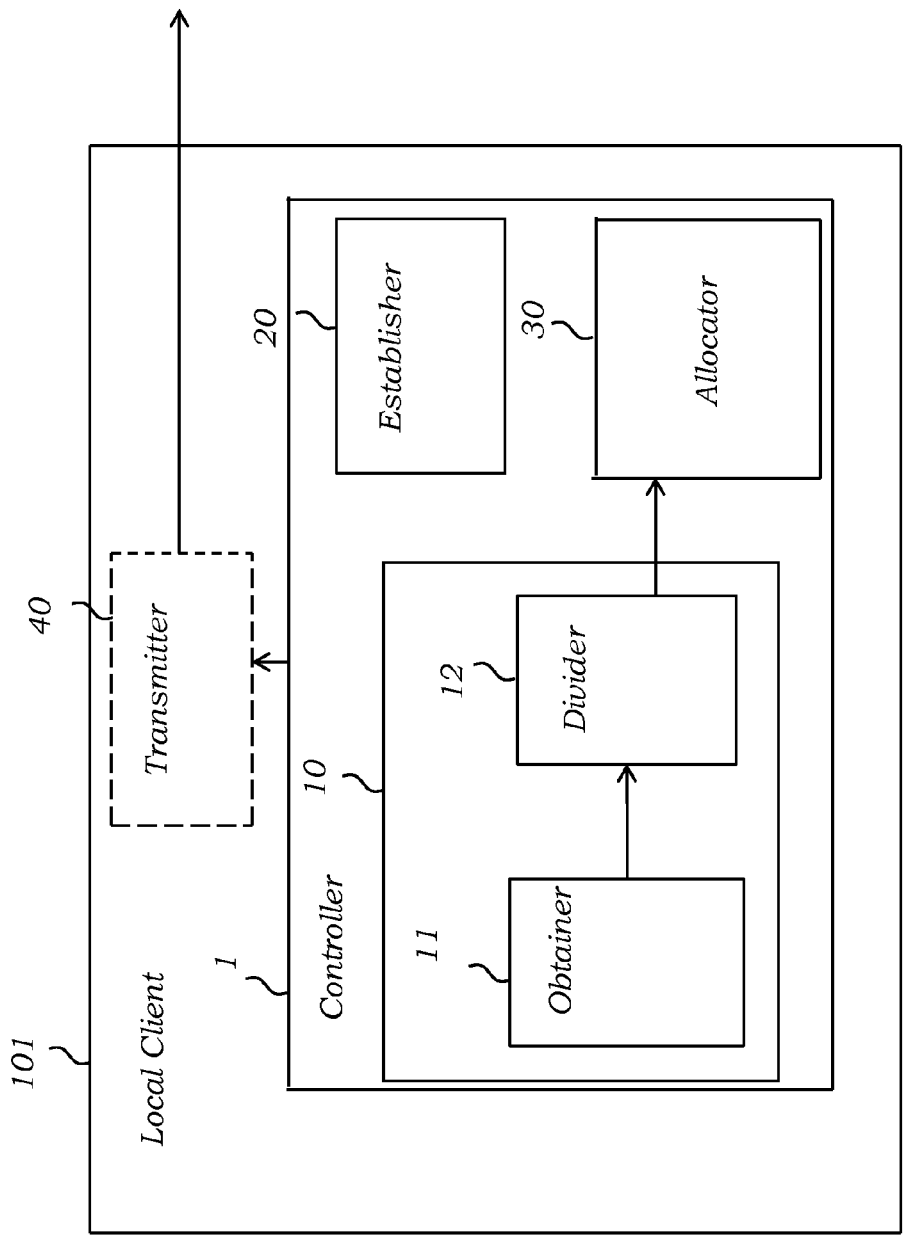
FIG. 17 is a schematic block diagram illustrating an example of a determiner in a local client for determining a number of time slots according to an embodiment.

FIG. 17 is a block diagram illustrating an example of a local client 101 wherein the determiner 10 further comprises an obtainer 11 that is configured to obtain a Time Distribution Window and a divider 12. The divider 12 is configured to divide the Time Distribution Window equally among the local clients of the Local switched Network to obtain a number of equally sized time slots corresponding to the number of transmitting local clients. The obtainer is communicating with the divider through a conventional data path.

In one possible embodiment of a local client the local client comprises a register 80 that includes a List of Local Addresses. The List of Local Addresses in turn comprises a mapping between the addresses and the IDs of all local clients in the Local switched Network. In this embodiment is the establisher 20 configured to establish the ID of the receiving client by accessing the register 80.

Figure 18:
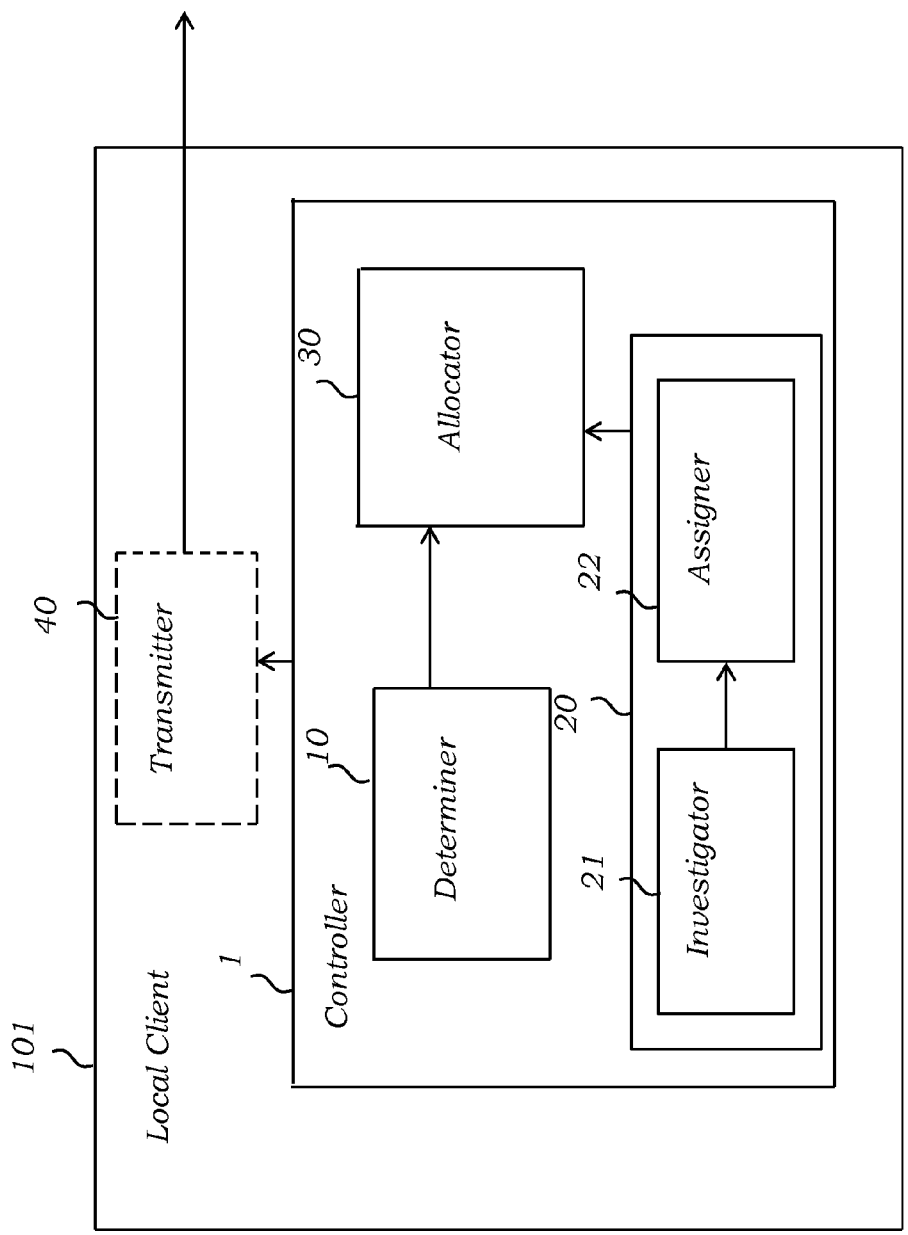
FIG. 18 is schematic block diagram illustrating an establisher in a local client for establishing an Identity Number, ID, by accessing a List of Local Addresses according to an embodiment.

FIG. 18 is a block diagram illustrating an example of at local client 101 wherein the establisher 20 comprises an investigator 21 that is configured to investigate whether a receiving client is a client located outside the Local switched Network. The establisher also comprises an assigner 22 that is configured to assign the ID of the local client to the receiving client if the receiving client is found to be located outside the Local switched Network. The investigator 21 is communicating with assigner 22 through a conventional data path.

A possible embodiment of a local client comprises an investigator 21 that in turn comprises a comparator 210. This comparator is configured to compare the address of the receiving client with the addresses that are included in the List of Local Addresses.

In one example of an embodiment of a local client is the allocator 30 configured to allocate a time slot for frame transmission by means of an allocation function, $i=(j+k) \bmod N,$ where i denote time slot number i in the Time Distribution Window, j denote the ID of the local client, k denote the ID of the receiving client and N denote the total number of Local Clients in the Local switched Network.

Figure 19:
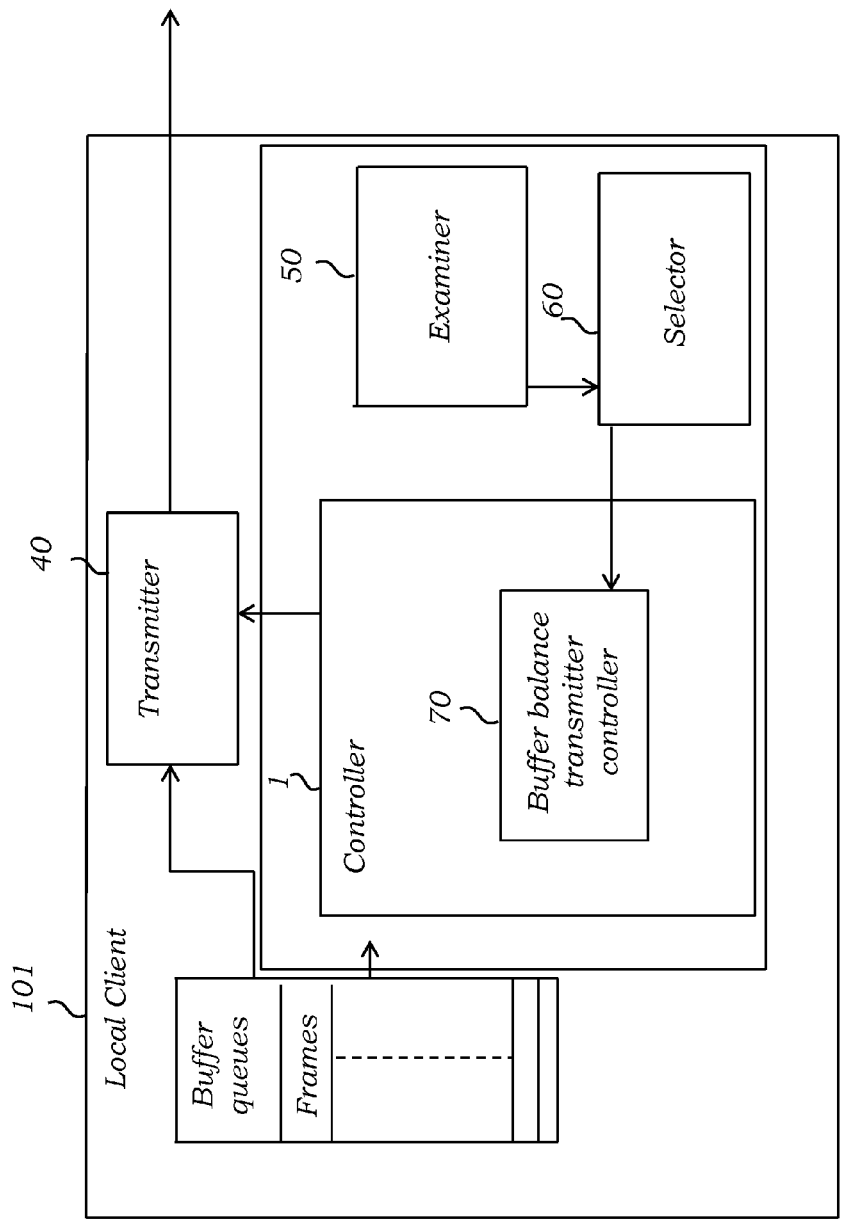
FIG. 19 is a schematic block diagram illustrating a local client for buffer balancing transmitting frames to a new receiving client according to an embodiment.

FIG. 19 is a block diagram illustrating a local client that also comprises an examiner 50 that is configured to examine whether there are still time left in said time slot when there are no more frames to transmit present in the buffer queue dedicated to the receiving client. The local client further comprises a selector 60 that is configured to select a new receiving client. Moreover the local client comprises a buffer balance transmitter controller 70 that is configured to control the transmission of frames to the new specific receiving client, from a buffer queue dedicated to the new receiving client, if there is still time left in said time slot. The examiner 50 is communicating with the selector 60 through a conventional data path. The selector 60 in turn is communicating with the buffer balance transmitting controller 70 through a conventional data path. The buffer balance transmitting controller 70 is communicating with the transmitter 40 through a conventional data path.

Figure 20:
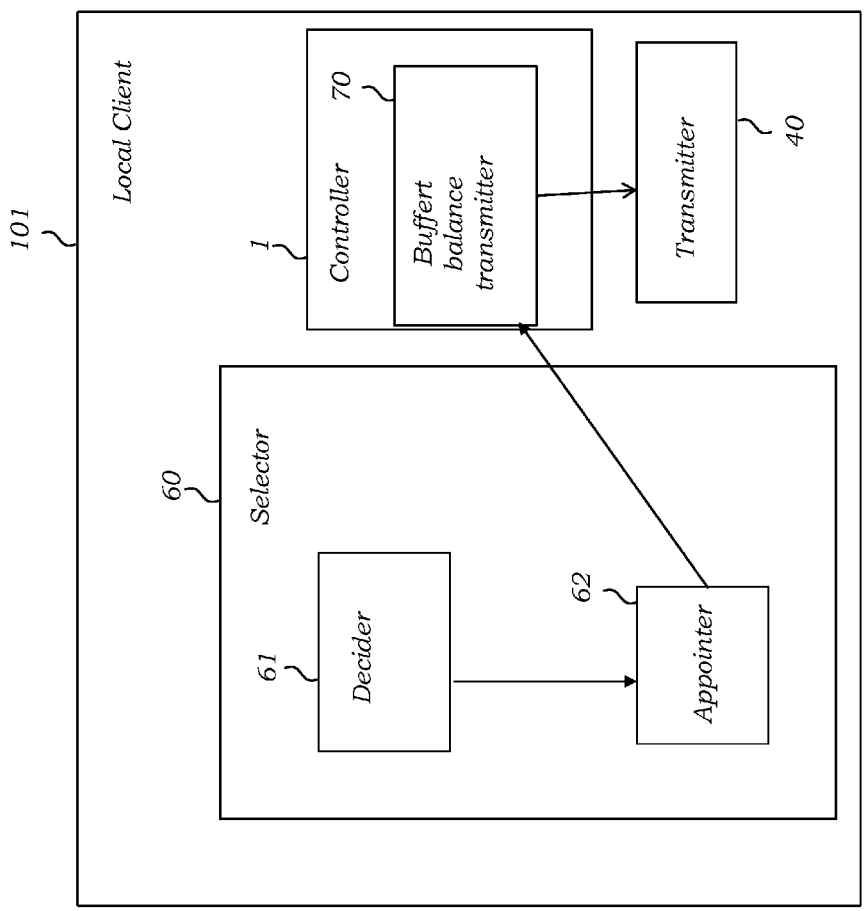
FIG. 20 is a schematic block diagram illustrating a selector in a local client used for buffer balancing transmitting frames according to an embodiment.

FIG. 20 is a block diagram illustrating an example of an embodiment of a local client. Here the selector 60 further comprises a decider 61 that is configured to decide which specific dedicated buffer queue of all dedicated buffer queues that needs to be balanced. The selector 60 also comprises an appointer 62 that is configured to appoint a new receiving client. This new receiving client is the receiving client that corresponds to the buffer queue that needs to be balanced. The decider 61 may be communicating with the appointer 62 through a conventional data path. The appointer may in turn be communicating with the buffer balance transmitting controller 70 through a conventional data path.

Figure 21:
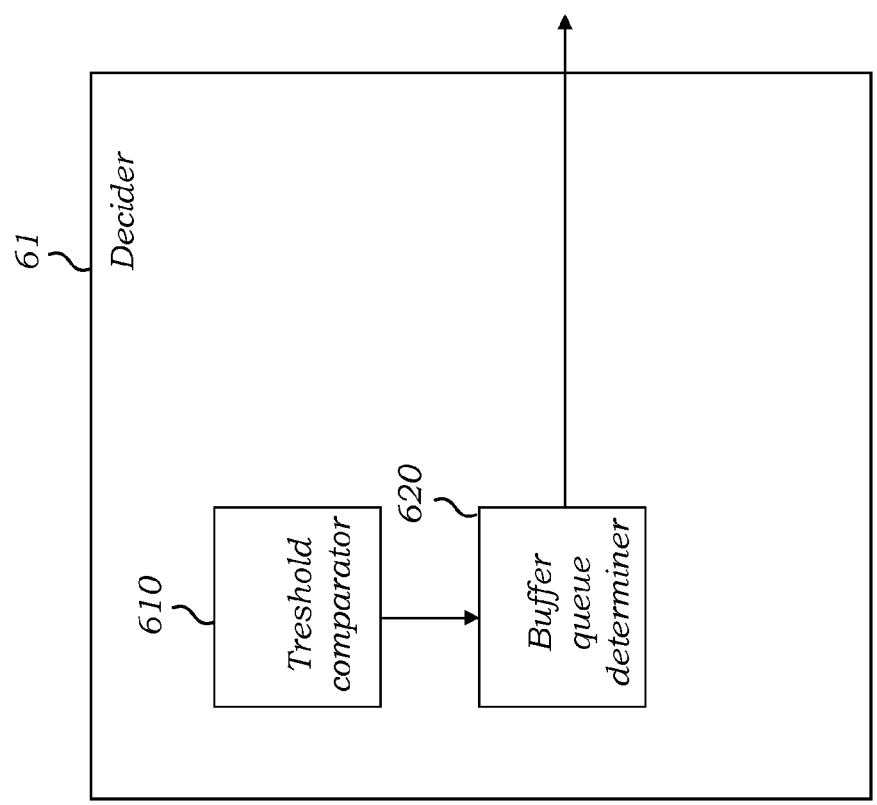
FIG. 21 is a schematic block diagram illustrating a decider in a local client for deciding a specific buffer queue that needs to be balanced.

FIG. 21 is a block diagram illustrating a further example of an embodiment of a local client in which the decider 61 comprises a threshold comparator 610 that is configured to compare the amount of frames in the buffer queue with a pre-determined threshold value that is indicative of an unbalanced buffer queue. The decider also comprises a buffer queue determiner 611 that is configured to determine whether a specific buffer queue needs to be balanced if the amount of frames in the specific buffer queue did exceed the pre-determined threshold value. The threshold comparator 610 is communicating with the buffer queue determiner 611 through a conventional data path.

In yet another example of an embodiment of a local client, will the appointer 62 comprise a prioritizer 620 that is configured to give priority to a pre-determined buffer queue in the case there is more than one buffer queue that needs to be balanced.

In still another example of an embodiment is the prioritizer (620) configured to give priority to a specific buffer queue that corresponds to a receiving client located outside the Local switched Network. In this way it is possible to balance the buffer queues that contain a lot of frames to receiving clients located outside the Local switched Network first. This might be preferable if there is a lot of transmission between the local clients and clients outside of the Local switched Network.

It is also possible to let the determiner 10 in the local client be configured to determine the number of time slots based on the number of connected local clients in the Local switched Network. In this way it is possible to use the Time Distribution Window more efficiently.

In a possible example of an alternative embodiment of a local client, the examiner 50 could be connected to a buffer balance checker 50' that is configured to check whether any of the dedicated buffers require buffer balancing. The buffer balance checker 50' could in turn be connected to the selector 60 and be configured to activate the selector 60 if the buffer balance checker 50' has decided that at least one of the buffer queues require buffer balancing. The act of checking whether any buffer queue require buffer balancing could make use of a threshold value as described with regard to the threshold comparator 610.

The local client as described in any of the embodiments given earlier may be a local client in a Local switched Network that is a Local switched Ethernet Network. In this particular Local switched Network will the frames to be transmitted be Ethernet frames.

According to another aspect of the proposed technology there is provided a computer program for performing, when executed by a computer, frame transmission distribution for a local client in a Local switched Network.

Figure 24:
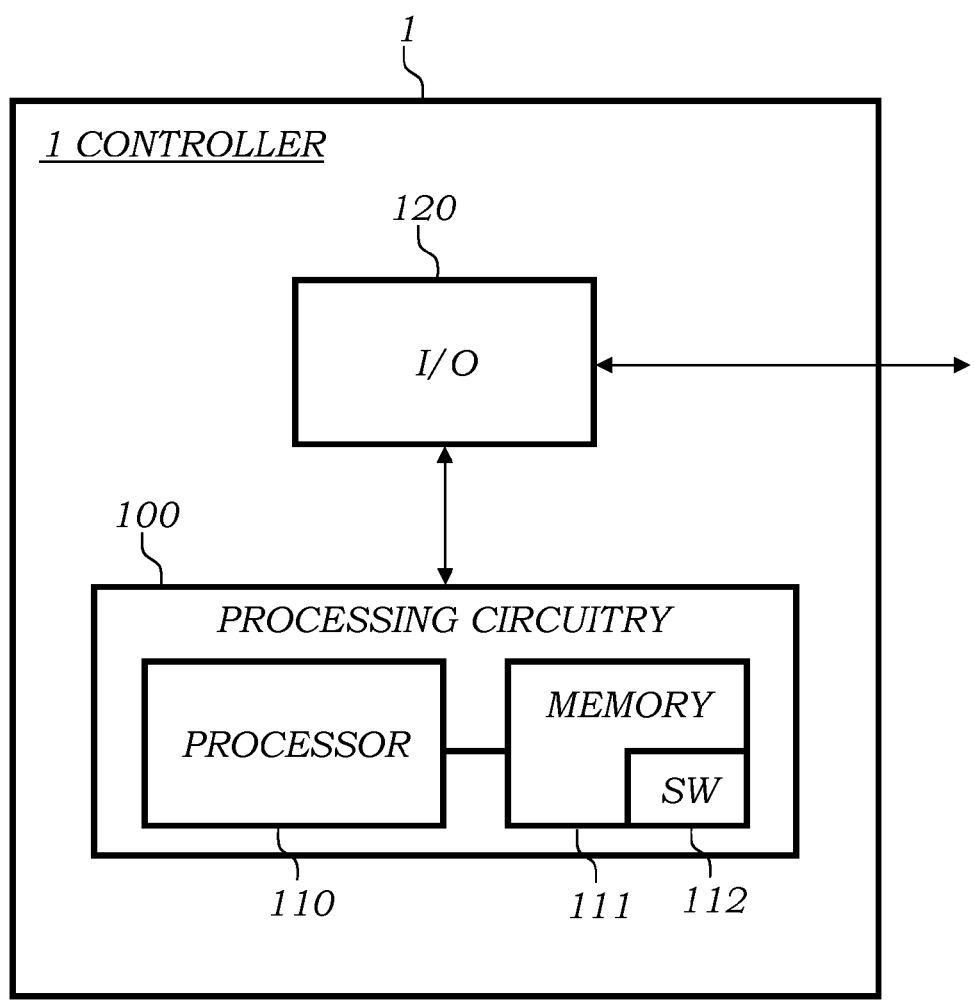
FIG. 24 is a schematic block diagram illustrating an example of an embodiment of a controller with devices for processing distributed frame transmission in a Local switched Network.

In FIG. 24 there is illustrated a computer program comprising program elements 112 configured to determine a number of frame transmission time slots based on the number of local clients in the Network and a Time Distribution Window (TDW). It also comprises program elements 112 that are configured to establish an ID of a receiving client. The computer program further comprises program elements 112 that are configured to allocate a specific frame transmission time slot among the number of frame transmission time slots for transmitting frames to a specific receiving client based on the ID of the local client, the established ID of the receiving client and the total number of local clients in the Local switched Network.

The computer program illustrated in FIG. 24 is carried on a computer-readable medium.

In one specific embodiment of the proposed technology the Local switched Network is a Local switched Ethernet Network. The proposed technology would normally be implemented in the Data Link Layer as defined by OSI. In the Data Link layer the access to the Network media in terms of frames is determined.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A distributed frame transmission method for a local client in a Local switched Network, the method comprises the steps of;
   determining a number of frame transmission time slots based on the number of local clients in the Local switched Network and a Time Distribution Window (TDW);
   establishing an Identity Number (ID) of a specific receiving client; and,
   allocating a specific frame transmission time slot among said number of frame transmission time slots for transmitting frames to said specific receiving client from a buffer queue dedicated to said specific receiving client based on an ID of the local client, the established ID of said receiving client and the total number of local clients in the Local switched Network;
   wherein the step of allocating a specific frame transmission time slot for transmitting to a specific receiving client comprises the step of performing the allocation by means of an allocation function, $i=(j+k) \bmod N$, where i denotes time slot number i in the Time Distribution Window, j denotes the ID of the local client, k denotes the ID of the receiving client, N denotes the total number local clients in the Local switched Network.

2. The method according to claim 1, wherein the step of determining a number of frame transmission time slots comprises:
   obtaining a pre-determined Time Distribution Window; and,
   dividing said obtained Time Distribution Window equally among the local clients of the Local switched Network to thereby obtain a number of equally sized time slots corresponding to the number of transmitting local clients.

3. The method according to claim 1, wherein the step of establishing an ID of a receiving client is performed by using a register comprising a List of Local Addresses reachable by the local client, said List of Local Addresses includes a mapping relating the address of each of the local clients in the Local switched Network with a corresponding ID.

4. The method according to claim 1, wherein the step of establishing an ID to a receiving client outside the network comprises the steps of:
   investigating whether said receiving client is a receiving client located outside the Local switched Network; and,
   assigning the ID of the local client to said receiving client if said receiving client is found to be located outside the Local switched Network.

5. The method according to claim 4, wherein said step of investigating whether said receiving client is located outside the Local switched Network comprises the step of comparing the address of said receiving client with the addresses included in the List of Local Addresses.

6. The method according to claim 1, further comprising the step of transmitting frames to said specific receiving client from a buffer queue dedicated to said specific receiving client in the frame transmission time slot allocated for transmission to said specific receiving client.

7. The method according to claim 6, further comprising the steps of:
   examining whether there is still time left in said time slot when there are no more frames to transmit present in the buffer queue dedicated to said receiving client;
   selecting a new receiving client if there is time left in said time slot; and,
   buffer balance transmitting frames to said new receiving client, from a buffer queue dedicated to said new receiving client, during the remaining time of said time slot.

8. The method according to claim 7, wherein the step of selecting a new receiving client comprises the steps of:
   deciding which specific dedicated buffer queue of all dedicated buffer queues that needs to be balanced; and,
   appointing a new receiving client, said new receiving client being the receiving client corresponding to the specific buffer queue that needs to be balanced.

9. The method according to claim 8, wherein the step of deciding which specific buffer queue that needs to be balanced comprises the steps of:
   threshold comparing the amount of frames in each of said buffer queues with a pre-determined threshold value indicative of an unbalanced buffer queue; and
   buffer queue determining that a specific buffer queue needs to be balanced if said amount of frames in said specific buffer queue exceeds said pre-determined threshold value.

10. The method according to claim 8, wherein the step of appointing comprises the step of prioritizing a pre-determined buffer queue if more than one buffer queue is determined to be in need of balancing in the buffer queue determining step.

11. The method according to claim 10, wherein the step of prioritizing a pre-determined buffer queue comprises prioritizing the specific buffer queue corresponding to a receiving client located outside the Local switched Network.

12. The method according to claim 1, wherein the number of local clients corresponds to the total number of connected local clients within the Local switched network.

13. The method according to claim 1, wherein said method is performed in a Local switched Network that is a Local switched Ethernet Network and wherein the frames to be transmitted are Ethernet frames.

14. A controller for distributed frame transmission for a local client in a Local switched Network, said controller comprising:
   a processor; and,
   a memory comprising computer instructions which when executed by the processor, cause the controller to:
      determine a number of frame transmission time slots based on the number of local clients in the Local switched Network and a Time Distribution Window (TDW);
      establish an Identity Number (ID) of a specific receiving client; and,
      allocate a specific frame transmission time slot among said number of frame transmission time slots for transmitting frames to said specific receiving client, from a buffer queue dedicated to said specific receiving client, based on an ID of the local client, said ID of the receiving client and the total number of local clients in the Local switched Network;
         wherein the computer instructions, which when executed by the processor, further cause the controller to allocate a time slot for frame transmission by means of an allocation function, $i=(j+k)\text{Mod } N,$ where i denote time slot number i in the TDW, j denote the ID of the local client, k denote the ID of the receiving client and N denote the total number of Local Clients in the Local switched Network.

15. The controller according to claim 14, wherein the computer instructions causing the controller to determine a number of frame transmission time slots based on the number of local clients in the Local switched Network and a TDW further comprise instructions, which when executed by the processor, cause the controller to:
   obtain a TDW; and,
   divide the TDW equally among the local clients of the Local switched Network to thereby obtain a number of equally sized time slots corresponding to the number of transmitting local clients.

16. The controller according to claim 14, further comprising a register stored in the memory including a List of Local Addresses, said List of Local Addresses comprising a mapping between the addresses and the IDs of all local clients in the Local switched Network, and wherein the computer instructions causing the controller to establish an ID of a specific receiving client further comprise computer instructions, which when executed by the processor, cause the controller to establish said ID of said receiving client by accessing said register.

17. The controller according to claim 14, wherein the computer instructions causing the controller to establish an ID of a specific receiving client further comprises instructions, which when executed by the processor, cause the controller to:
   investigate whether a receiving client is a client located outside the Local switched Network; and,
   assign the ID of the local client to the receiving client if said receiving client is found to be located outside the Local switched Network.

18. The controller according to claim 17, wherein the computer instructions, which when executed by the processor, further cause the controller to compare the address of said receiving client with the addresses included in the List of Local Addresses.

19. The controller according to claim 14, wherein said controller is included in a local client in a Local switched Network where said Local switched Network is a Local switched Ethernet Network and where the frames are Ethernet frames.

20. A local client in a Local switched Network comprising:
   a processor; and,
   a memory comprising computer instructions, which when executed by the processor, cause the local client to:
      determine a number of frame transmission time slots based on the number of local clients in the Local switched Network and a Time Distribution Window (TDW);
      establish an Identity Number (ID) of a specific receiving client; and,
      allocate a specific frame transmission time slot among said number of frame transmission time slots for transmitting frames to said specific receiving client, from a buffer queue dedicated to said specific receiving client, based on an ID of the local client, said ID of the receiving client and the total number of local clients in the Local switched Network;
      further comprising instructions, which when executed by the processor, cause the local client to allocate a time slot for frame transmission by means of an allocation function, $i=(j+k)\text{Mod } N,$ where i denote time slot number i in the TDW, j denote the ID of the local client, k denote the ID of the receiving client and N denote the total number of Local Clients in the Local switched Network.

21. The local client according to claim 20, wherein computer instructions causing the local client to determine a number of frame transmission time slots based on the number of local clients in the Local switched Network and a TDW further comprises instructions, which when executed by the processor, cause the local client to:
   obtain a TDW; and,
   divide the TDW equally among the local clients of the Local switched Network to thereby obtain a number of equally sized time slots corresponding to the number of transmitting local clients.

22. The local client according to claim 20, further comprising a register stored in the memory including a List of Local Addresses, said List of Local Addresses comprising a mapping between the addresses and the IDs of all local clients in the Local switched Network, and
   wherein the computer instructions causing the local client to establish an ID of a specific receiving client further comprises instructions, which when executed by the processor, cause the local client to establish said ID of said receiving client by accessing said register.

23. The local client according to claim 20, wherein the computer instructions causing the local client to establish an ID of a specific receiving client further comprises instructions, which when executed by the processor, cause the local client to:
   investigate whether a receiving client is a client located outside the Local switched Network; and,
   assign the ID of the local client to the receiving client if said receiving client is found to be located outside the Local switched Network.

24. The local client according to claim 23, wherein the computer instructions causing the local client to investigate whether a receiving client is a client located outside the Local switched Network further comprises instructions, which when executed by the processor, cause the local client to compare the address of said receiving client with the addresses included in the List of Local Addresses.

25. The local client according to claim 20, further comprising computer instructions, which when executed by the processor, cause the local client to transmit frames to said specific receiving client in the frame transmission time slot allocated for transmission to said specific receiving client.

26. The local client according to claim 25, further comprising computer instructions, which when executed by the processor, cause the local client to:
   examine whether there is still time left in said time slot when there are no more frames to transmit present in the buffer queue dedicated to said receiving client;
   select a new receiving client; and,
   control transmission of frames to said new specific receiving client, from a buffer queue dedicated to said new receiving client, if there is still time left in said time slot.

27. The local client according to claim 26, wherein the computer instructions causing the local client to select a new receiving client further comprises instructions, which when executed by the processor, cause the local client to:
   decide which specific dedicated buffer queue of all dedicated buffer queues that needs to be balanced; and,
   appoint a new receiving client, wherein said new receiving client is the receiving client corresponding to the buffer queue that needs to be balanced.

28. The local client according to claim 27, wherein the computer instructions causing the local client to decide which specific dedicated buffer queue of all dedicated buffer queues that needs to be balanced further comprises instructions, which when executed by the processor, cause the local client to:
   compare the amount of frames in said buffer queue with a pre-determined threshold value indicative of an unbalanced buffer queue; and,
   determine whether a specific buffer queue needs to be balanced if said amount of frames in said specific buffer queue exceeds said pre-determined threshold value.

29. The local client according to claim 27, further comprising computer instructions, which when executed by the processor, cause the local client to give priority to a pre-determined buffer queue if more than one buffer queue is in need of balancing.

30. The local client according to claim 29, wherein the computer instructions causing the local client to give priority to a pre-determined buffer queue further comprises instructions, which when executed by the processor, cause the local client to give priority to a specific buffer queue corresponding to a receiving client located outside the Local switched Network.

31. The local client according to claim 20, comprising further instructions, which when executed by the processor, cause the local client to determine the number of time slots based on the number of connected local clients in the Local switched Network.

32. The local client according to claim 20, wherein said local client is a local client in a Local switched Network that is a Local switched Ethernet Network and wherein the frames to be transmitted are Ethernet frames.

33. A non-transitory computer readable medium comprising instructions, which when executed by a computer, are configured to provide distributed frame transmission for a local client in a Local switched Network, wherein instructions for providing distribute frame transmission for a local client in a Local switched Network are further configured to, when executed:
   determine a number of frame transmission time slots based on the number of local clients in the Network and a Time Distribution Window (TDW);
   establish an Identity Number (ID) of a specific receiving client; and,
   allocate a specific frame transmission time slot among said number of frame transmission time slots for transmitting frames to said specific receiving client, from a buffer queue dedicated to said specific receiving client, based on an ID of the local client, the established ID of the receiving client and the total number of local clients in the Local switched Network;
   wherein the step of allocating a specific frame transmission time slot for transmitting to a specific receiving client comprises the step of performing the allocation by means of an allocation function, $$i=(j+k) \bmod N,$$

where i denotes time slot number i in the Time Distribution Window, j denotes the ID of the local client, k denotes the ID of the receiving client, N denotes the total number local clients in the Local switched Network.

* * * * *